US005608623A

United States Patent [19]

Sata et al.

[11] Patent Number: 5,608,623

[45] Date of Patent: Mar. 4, 1997

[54] SPECIAL COOCCURRENCE PROCESSING METHOD AND APPARATUS

[75] Inventors: Ichiko Sata, Nara; Yoji Fukumochi, Kobe, both of Japan

[73] Assignee: Sharp Kabushiki Kaisha, Osaka, Japan

[21] Appl. No.: 242,670

[22] Filed: May 13, 1994

[30] Foreign Application Priority Data

May 14, 1993 [JP] Japan .................................. 5-113412

[51] Int. Cl.$^{6}$ .................................................. G06F 17/27

[52] U.S. Cl. .......................................... 395/754; 395/752

[58] Field of Search ........................ 364/419.04, 419.02, 364/419.05, 419.08

[56] References Cited

U.S. PATENT DOCUMENTS 4,833,611 5/1989 Fukumochi et al. ............... 364/419.05
4,894,779 1/1990 Suzuki et al. ...................... 364/419.02
4,916,614 4/1990 Kaji et al. .............................. 364/419
4,942,526 7/1990 Okajima et al. ....................... 364/419
4,964,030 10/1990 Suzuki et al. ...................... 364/419.06
5,195,032 3/1993 Matsui et al. ...................... 364/419.05
5,257,187 10/1993 Suzuki et al. ...................... 364/419.02
5,321,607 6/1994 Fukumochi et al. ............... 364/419.04

FOREIGN PATENT DOCUMENTS 4-17064 1/1992 Japan ............................... 364/419.02

*Primary Examiner*—Gail O. Hayes
*Assistant Examiner*—Frantzy Poinvil

[57] ABSTRACT

A machine translation system has a dictionary wherein a single special cooccurrence code or a collective special cooccurrence code is stored in association with entry words in a first language which have a dependency relation among them and which are separately stored. A pair of entry and equivalent words is associated with another pair of entry and equivalent words via the same single or collective special cooccurrence code when the entry words in the pairs have a dependency relation between them. An equivalent-word selector searches the dictionary for a subordinate-side pair of entry and equivalent words having the same single special cooccurrence code or collective special cooccurrence code as that of a dominant-side pair of entry and equivalent words for a head or modifier in a case structure tree, so that cooccurring equivalent words in a second language of the cooccurring entry words are determined. A translation generator generates a translation in the second language based on the case structure tree and the cooccurring equivalent words determined.

22 Claims, 15 Drawing Sheets

TEXT : This is a pen.

| t | h | i | s | | | | |
|---|---|---|---|---|---|---|---|
| i | s | | | | | | |
| a | | | | | | | |
| p | e | n | | | | | |
| . | | | | | | | |

~15

| | | | ~16 |
|---|---|---|---|
| this —— | Pronoun | Demonstrative adjective | |
| is —— | Verb | | |
| a —— | Article | | |
| pen —— | Noun | | |

*Fig.5*
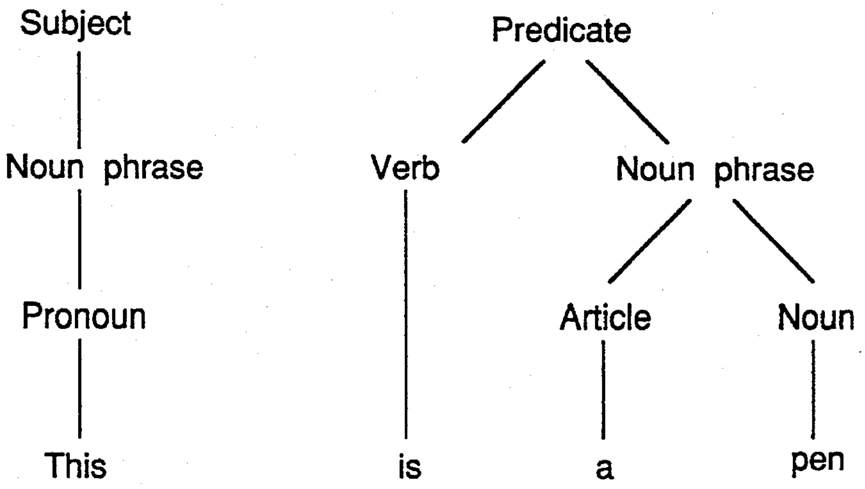
*Fig.6*
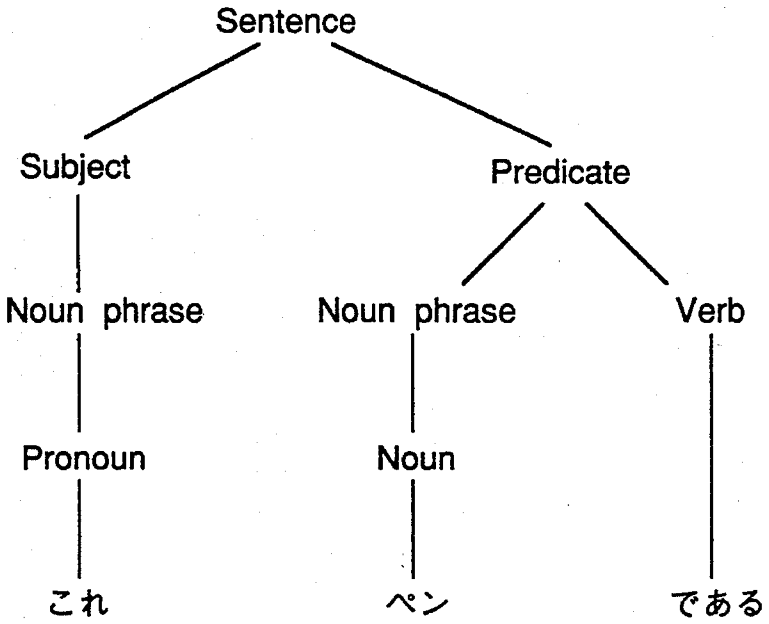
*Fig.7*
これはペンである。

Fig.8

[ ENTRY : give ] [ PART OF SPEECH : verb ]

| EQUIVALENT WORD NO. | EQUIVALENT WORD | SEMANTIC ATTRIBUTE CODE | SURFACE CASE PATTERN NO. | PRIORITY | CASE ELEMENT NO. | CASE ELEMENT SURFACE NAME | CASE ELEMENT PREPOSITION | CASE ELEMENT SEMANTIC RESTRICTION |
|---|---|---|---|---|---|---|---|---|
| 000 | (～を) 与える | 5300 | 01 | 07 | 2 | noun phrase | — | — |
| | | | | | 3 | prepositional phrase | to (～に) | — |
| 060 | (～を) 払う | 5410 | 01 | 00 | 2 | noun phrase | — | 8000 |
| | | | | | 3 | prepositional phrase | to (～に) | — |

Fig.9

[ ENTRY : attention ] [ PART OF SPEECH : noun ]

| EQUIVALENT WORD NO. | EQUIVALENT WORD | SEMANTIC ATTRIBUTE CODE | SURFACE CASE PATTERN NO. |
|---|---|---|---|
| 000 | 注意 | 8000<br>0710 | 00 |

*Fig.10*

[ ENTRY : make ] [ PART OF SPEECH : verb ]

| EQUIVALENT WORD NO. | EQUIVALENT WORD | SEMANTIC ATTRIBUTE CODE | SURFACE CASE PATTERN NO. | PRIORITY | CASE ELEMENT NO. | CASE ELEMENT SURFACE NAME | CASE ELEMENT SEMANTIC RESTRICTION | OTHER CONDITIONS |
|---|---|---|---|---|---|---|---|---|
| 000 | (～を) 作る | 5600 | 00 | 07 | 2 | noun phrase | — | — |
| 015 | (～) する | 5820 | 00 | 00 | 2 | noun phrase | 9000 | Only for active voice. Case-element modification not permitted. |
| 020 | (～を) する | 5820 | 00 | 01 | 2 | noun phrase | 9001 | Only for active voice. |
| 025 | (～が) 行われる | 5815 | 00 | 02 | 2 | noun phrase | 9002 | Only for passive voice. |

*Fig.11*

[ ENTRY : adjustment ] [ PART OF SPEECH : noun ]

| EQUIVALENT WORD NO. | EQUIVALENT WORD | SEMANTIC AT-TRIBUTE CODE | SURFACE CASE PAT-TERN NO. | |
|---|---|---|---|---|
| 000 | 調整 | 9000<br>9001<br>9002<br>0583 | 00 | |

*Fig.12*

[ ENTRY : analysis ] [ PART OF SPEECH : noun ]

| EQUIVALENT WORD NO. | EQUIVALENT WORD | SEMANTIC AT-TRIBUTE CODE | SURFACE CASE PAT-TERN NO. | |
|---|---|---|---|---|
| 000 | 分析 | 9000<br>9001<br>9002<br>0601 | 00 | |

*Fig. 13*

[ ENTRY : assumption ] [ PART OF SPEECH : noun ]

| EQUIVALENT WORD NO. | EQUIVALENT WORD | SEMANTIC ATTRIBUTE CODE | SURFACE CASE PATTERN NO. | PRIORITY | CASE ELEMENT NO. | CASE ELEMENT SURFACE NAME | |
|---|---|---|---|---|---|---|---|
| 000 | 仮定 | 9000<br>9001<br>9002<br>0411 | 00 | — | — | — | |
| | | | 01 | — | 1 | that-clause<br>(～という) | |

*Fig. 14*

[ ENTRY : preparation ] [ PART OF SPEECH : noun ]

| EQUIVALENT WORD NO. | EQUIVALENT WORD | SEMANTIC ATTRIBUTE CODE | SURFACE CASE PATTERN NO. | PRIORITY | CASE ELEMENT NO. | CASE ELEMENT SURFACE NAME | CASE ELEMENT PREPOSITION |
|---|---|---|---|---|---|---|---|
| 000 | 準備 | 9000<br>9001<br>9002<br>0720 | 00 | — | — | — | — |
| | | | 02 | — | 1 | prepositional phrase | for<br>(～の) |

*Fig.15*

[ ENTRY : high ] [ PART OF SPEECH : adjective ]

| EQUIVA-LENT WORD NO. | EQUIVA-LENT WORD | SEMANTIC ATTRIBUTE CODE | SURFACE CASE PAT-TERN NO. | PRIORITY | SUBORDINATE COUNTER-PART NO. | SUBORDINATE COUTERPART SURFACE NAME | SUBORDINATE COUTERPART SEMANTIC RESTRICTION | |
|---|---|---|---|---|---|---|---|---|
| 000 | 高い | 3101 | 00 | 01 | 1 | noun phrase | — | |
| 040 | 高 | 3205 | 00 | 00 | 1 | noun phrase | 9010 | |

*Fig.16*

[ ENTRY : coupon ] [ PART OF SPEECH : noun ]

| EQUIVALENT WORD NO. | EQUIVALENT WORD | SEMANTIC AT-TRIBUTE CODE | SURFACE CASE PAT-TERN NO. | |
|---|---|---|---|---|
| 000 | クーポン | 0339 | 00 | |
| 020 | 利回り | 9010<br>0155 | 00 | |

Fig. 17

[ ENTRY : interest ] [ PART OF SPEECH : noun ]

| EQUIVALENT WORD NO. | EQUIVALENT WORD | SEMANTIC ATTRIBUTE CODE | SURFACE CASE PATTERN NO. |
|---|---|---|---|
| 000 | 興味 | 0421 | 00 |
| 010 | 金利 | 9010<br>0824 | 00 |

Fig. 18

[ ENTRY : speed ] [ PART OF SPEECH : noun ]

| EQUIVALENT WORD NO. | EQUIVALENT WORD | SEMANTIC ATTRIBUTE CODE | SURFACE CASE PATTERN NO. |
|---|---|---|---|
| 000 | スピード | 0217 | 00 |
| 020 | 速 | 9010 | 00 |

Fig. 19

[ ENTRY : tension ] [ PART OF SPEECH : noun ]

| EQUIVALENT WORD NO. | EQUIVALENT WORD | SEMANTIC ATTRIBUTE CODE | SURFACE CASE PATTERN NO. | FIELD |
|---|---|---|---|---|
| 000 | 緊張 | 0358 | 00 | — |
| 030 | 圧 | 9010<br>0358 | 00 | Electrical |

| $f_1 1$ | $f_1 2$ | $f_1 3$ |
|---|---|---|
| adjustment | 9000,9001,9002 | NN |
| attention | 8000 | NN |
| analysis | 9000,9001,9002 | NN |
| assumption | 9000,9001,9002 | NN |
| coupon | 9010 | NN |
| give | 8000 | VB* |
| high | 9010 | AJ* |
| interest | 9010 | NN |
| make | 9000,9001,9002 | VB* |
| preparation | 9000,9001,9002 | NN |
| speed | 9010 | NN |
| tension | 9010 | NN |

| $f_2 1$ | $f_2 2$ | $f_2 3$ |
|---|---|---|
| 8000 | give | attention |
| 9000 | make | adjustment |
| 9000 | make | analysis |
| 9000 | make | assumption |
| 9000 | make | preparation |
| 9001 | make | adjustment |
| 9001 | make | analysis |
| 9001 | make | assumption |
| 9001 | make | preparation |
| 9002 | make | adjustment |
| 9002 | make | analysis |
| 9002 | make | assumption |
| 9002 | make | preparation |
| 9010 | high | coupon |
| 9010 | high | interest |
| 9010 | high | speed |
| 9010 | high | tension |

Fig.25

TRANSLATION1: 彼は、それに注意を払った。

TRANSLATION2: 彼は、調整した。

TRANSLATION3: 彼は、注意深く分析した。

TRANSLATION4: 彼は、仮定した。

TRANSLATION5: 彼は、急いで準備した。

TRANSLATION6: 彼は、彼女がそれを食べるという仮定をした。

TRANSLATION7: 彼は、2,3のマイナな調整をした。

TRANSLATION8: 彼は、注意深い分析をした。

TRANSLATION9: 彼は、パーティーの準備をした。

TRANSLATION10: 精密な調整が行われるべきである。

TRANSLATION11: 注意深い分析が行われた。

TRANSLATION12: 間違った仮定が行われた。

TRANSLATION13: 最終的な準備が行われた。

TRANSLATION14: 高利回り

TRANSLATION15: 高金利

TRANSLATION16: 高速

TRANSLATION17: 高圧

Fig.26

COOCURRENCE INFORMATION1:
give 〈attention〉 to (〜に) 〈注意〉 を払う

COOCURRENCE INFORMATION2:
give 〈attention〉 to (〜に) 〈注意〉 を払う

COOCURRENCE INFORMATION3:
high 〈coupon〉 高利回り
high 〈interest〉 高金利
high 〈speed〉 高速
high 〈tension〉 高圧 (分野=電気)

SPECIAL COOCCURRENCE PROCESSING METHOD AND APPARATUS

BACKGROUND OF THE INVENTION

1. Field of the Invention

The present invention relates to a method of processing cooccurrence of words in a first language and of equivalents of the words in a second language. More particularly, it relates to a special cooccurrence processing method for processing a special type of cooccurrence wherein two or more words in the first language, having dependency relation between them, when cooccurring, would be translated into special equivalents in the second language; or a special type of cooccurrence wherein two or more cooccurring words in the first language having dependency relation between them, when translated into the second language, would cause a cooccurrence of their equivalents in the second language to be generated. The invention also relates to a system using the special cooccurrence processing method such as electronic dictionaries, machine translation systems, and information retrieval systems.

2. Description of the Prior Art

Conventionally, there have been available electronic dictionaries (hereinafter, referred to simply as dictionaries) which store various types of information such as entry words, parts of speech of the entry words, morphological information, equivalent words, parts of speech of the equivalent words, and information on case elements. There have been also information retrieval systems which have such dictionaries or similar information storage and which, upon receipt of a particular key word, output information corresponding to the key word. Also, there have been machine translation systems which have such dictionaries or similar information storage and which, upon input of a first language, convert the first language into a second language and output the conversion result.

In the information retrieval systems or machine translation systems as described above, the following problem may occur. In converting a first language into a second language, if proper consideration is not paid to the cooccurrence between words in the first language, a word of the highest frequency of use may simply be adopted as its equivalent in the second language even though the word in the first language has a plurality of equivalents in the second language. The resulting information may be meaningless or unnatural.

Thus, in the information retrieval systems or machine translation systems as described above, the following cooccurrence processing methods are generally used to process the cooccurrence among words:

(1) For dealing with semantic cooccurrence of words, making use of the "semantic attributes" refers to semantic concepts of various words being systematically classified. A "semantic attribute of a cooccurring word" is specified as information with the counterpart of a particular pair of entry and equivalent words registered in the dictionary or other similar information storage;

(2) For dealing with the cooccurrence relation between one particular word and another, a series of cooccurring words is registered in the dictionary or other similar information storage as a "composite entry word"; and (3) For dealing with the cooccurrence relation between one particular word and another, an "entry word of a cooccurring word" is specified as information with the counterpart of a particular pair of entry and equivalent words registered in the dictionary or other similar information storage.

However, the above conventional cooccurrence processing methods have the following problems:

(a) In the method of paragraph (1) utilizing "semantic attributes", there is a great difficulty in constructing a semantic concept system that allows semantic concepts of all the words to be perfectly classified without inconsistency. Moreover, since the individual "semantic attributes" are assigned by a human, the way the semantic concepts are grasped may vary depending on the person who constructs the system.

Accordingly, although the semantic cooccurrence processing using the "semantic attributes" has indeed a substantial effect when generally processing common semantic cooccurrences, it is still insufficient for dealing with such special cooccurrences of words as defined above without adversely affecting other cooccurrence relations relating to the words.

(b) In the method of paragraph (2) involving registration of the "composite entry words," it considerably burdens the worker when all possible combinations of the words to cooccur with each other in the first language are treated as the "composite entry words" individually and registered with information such as equivalent words imparted thereto. Also, maintenance of the information is difficult, and moreover computation resources may be spent in vain.

Further, treating a set of words to cooccur as a "composite entry word" causes the words to be fixed, so that the cooccurrence processing will not be successful when some modifier is placed between cooccurring words. Otherwise, in the cases of "composite entry words" which are originally verbal phrases, the expected result could not be obtained if the voice is changed.

(c) In the method of paragraph (3) in which the "entry word of a cooccurring word" is specified as information on the counterpart of a specific word, only specifying the "entry of a cooccurring word" as the information on the counterpart of a specific pair of entry and equivalent words could not ensure the obtainment of an adequate equivalent word in the second language of the word cooccurring with the specific word in the first language. Accordingly, the method is insufficient for processing the cooccurrence relation.

SUMMARY OF THE INVENTION

The present invention has been developed with a view to substantially solving the above described disadvantages and has for its essential object to provide a cooccurrence processing method and apparatus capable of processing the special cooccurrences much more successfully than the prior art when converting or translating from a first language to a second language.

In order to achieve the aforementioned objective, the present invention provides a cooccurrence processing method of processing cooccurrence of a plurality of words in a first language, having a dependency relation among them, when the first language is translated into a second language, comprising the steps of:

preparing entry words in the first language representing words in the first language, and preparing equivalent words to the entry words in the second language;

coupling the entry words with their equivalent words into pairs of entry and equivalent words;

associating a first pair of entry and equivalent words with a second pair of entry and equivalent words which may cooccur with the first pair by imparting a code to the first and second pair, wherein a word in the first language represented by the entry word of the first pair is a dominant word and a word in the first language represented by the entry word of the second pair is a subordinate word syntactically dependent on the dominant word;

designating the entry word in one of the first and second associated pairs of entry and equivalent words when the words in the first language represented by the entry words of the first and second pairs cooccur; and searching for the other of the first and second pairs of entry and equivalent words using the imparted code.

In order to implement the above method, the present invention also provides an apparatus for processing cooccurrence of a plurality of words in a first language, having a dependency relation among them, when the first language is converted into a second language, comprising:

language information storage means for storing entry words in the first language representing respective words in the first language, and equivalent words of the entry words in the second language, in pairs, wherein a first pair of entry and equivalent words is associated with a second pair of entry and equivalent words which may cooccur with the first pair by a cooccurrence code imparted to the first and second pairs, wherein a word in the first language represented by the entry word of the first pair is a dominant word and a word in the first language represented by the entry word of the second pair is a subordinate word syntactically dependent on the dominant word; and first search means for, upon receipt of the entry word in one of the first and second associated pairs of entry and equivalent words, searching the language information storage means for the other of the first and second pairs of entry and equivalent words using the imparted cooccurrence code.

Note that the term "dominant word" or "governing word" used in this specification should be defined as a word having a right to designate a word as its counterpart to cooccur therewith, and the term "subordinate word" should be defined as a word designated as the subordinate word by the dominant word. Also, the term "dependency relationship" used in the specification signifies a relation between the dominant and subordinate words and between the associated pairs of entry and equivalent words corresponding to the dominant and subordinate words. The term "dominant-subordinate relation" is also used in this specification.

The code imparted to the associated pairs of entry and equivalent words may be a semantic code representing a semantic cooccurrence relationship between the dominant word and the subordinate word. In this case, when the dominant word can semantically cooccur with only one subordinate word, the code indicates that the associated pairs of entry and equivalent words corresponding to the dominant and subordinate words are in one-to-one correspondence. On the other hand, when the dominant word can semantically cooccur with any one of a plurality of subordinate words, the code indicates that the associated pairs of entry and equivalent words are in one-to-several correspondence.

The cooccurrence code indicates only the cooccurrence relationship between the associated pairs of entry and equivalent words. Therefore, the cooccurrence processing method and apparatus of the present invention can process the special cooccurrences as defined above in a simple manner through the cooccurrence codes without adversely affecting any other cooccurrence relationship. Further, even if any modifier interrupts between the cooccurring words or if the "voice" and hence, the order of the words, is changed, the cooccurrence can be processed. As a result, cooccurrence processing can be performed successfully.

According to the present invention, by simply using the cooccurrence codes, cooccurrence information between pairs of entry and equivalent words can be constructed much more easily than in the conventional case where the composite entry words are used. This in turn facilitates the maintenance of the cooccurrence information. Thus, computation resources required for construction and maintenance of the cooccurrence information can be saved.

Preferably, the language information storage means further stores information on limitations in selecting, when an entry word has a plurality of equivalent words, one from the equivalent words such that an appropriate equivalent is selected.

The cooccurrence processing apparatus may be an electronic dictionary, a machine translation system, or an information retrieval system.

When the cooccurrence processing apparatus is a machine translation system, it further comprises:

inputting means for inputting a text in the first language;

analyzing means for syntactically analyzing the text in the first language; and translation generation means for, when the text inputted by the inputting means contains a dominant word and a subordinate word syntactically dependent upon the dominant word that cooccur, generating a translation in the second language of the text based on the associated pairs of entry and equivalent words for the dominant and subordinate words.

According to the machine translation system, proper equivalent words of the key words corresponding to the cooccurring dominant and subordinate words in the text are easily obtained. Therefore, a correct and natural translation of the text is generated.

When the cooccurrence processing apparatus is an information retrieval apparatus, it further comprises:

inputting means for inputting a key word in the first language;

second search means for searching for an entry word matching the inputted key word such that the first search means performs the search of the language information storage means using the entry word matching the inputted key word; and information generation means for generating cooccurring pieces of information based on a pair of entry and equivalent words corresponding to the key word and its associated pair of entry and equivalent words obtained as a result of the search by the first search means.

In this information retrieval system, the language information storage means is searched based on an input key word. Then, a pair of entry and equivalent words associated with a pair of entry and equivalent words corresponding to the key word is determined by using the cooccurrence code. Further, based on both the pair of entry and equivalent words relating to the key word and the pair of entry and equivalent words determined, cooccurrence information is generated in a given procedure.

In other words, only inputting of a key word can provide the cooccurrence information because the associated dominant-side and subordinate side pairs of entry and equivalent words are not registered in a fixed manner.

Therefore, even if a perfect form of an idiom or phrase is unknown, only inputting a key word that forms part of the idiom or phrase containing cooccurring words allows the relevant cooccurrence information to be retrieved.

The information retrieval system may further comprises:

a first table listing the entry words, the cooccurrence codes and parts of speech, which are all extracted from the language information storage means, and are arranged in correspondence to each other; and a second table listing the cooccurrence codes, the entry words corresponding to dominant words and the entry words corresponding to subordinate words, which are arranged in correspondence to each other, wherein the second search means search the first and second tables for the entry word matching the inputted key word and an entry word having the dependency relation with the entry word matching the key word.

In this case, the cooccurring entry words are readily found, so that cooccurrence information are retrieved quickly.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 illustrates an example of a parse tree stored in a syntactic structure buffer of the machine translation system of FIG. 1;

FIG. 6 illustrates an example of a case structure tree stored in a transformed-tree buffer of the machine translation system of FIG. 1;

FIG. 7 illustrates an example of a translation stored in an output sentence buffer of the machine translation system of FIG. 1;

FIGS. 8–19 illustrate examples of contents of a dictionary of the machine translation system of FIG. 1;

FIG. 22 illustrates an example of contents of a first cooccurrence table used in the information retrieval system of FIG. 21;

FIG. 23 illustrates an example of contents of a second cooccurrence table used in the information retrieval system of FIG. 21;

FIG. 25 shows examples of Japanese translations obtained by the machine translation system adopting the special cooccurrence processing method of the present invention, wherein underlined portions in the translations correspond to cooccurring English words; and FIG. 26 shows examples of cooccurrence information obtained by the information retrieval system adopting the special cooccurrence processing method of the present invention.

DETAILED DESCRIPTION OF THE PREFERRED EMBODIMENTS

First Embodiment

In this embodiment, description is made on an example of the machine translation system which performs translation process by using the special cooccurrence processing method of the present invention.

Figure 1:
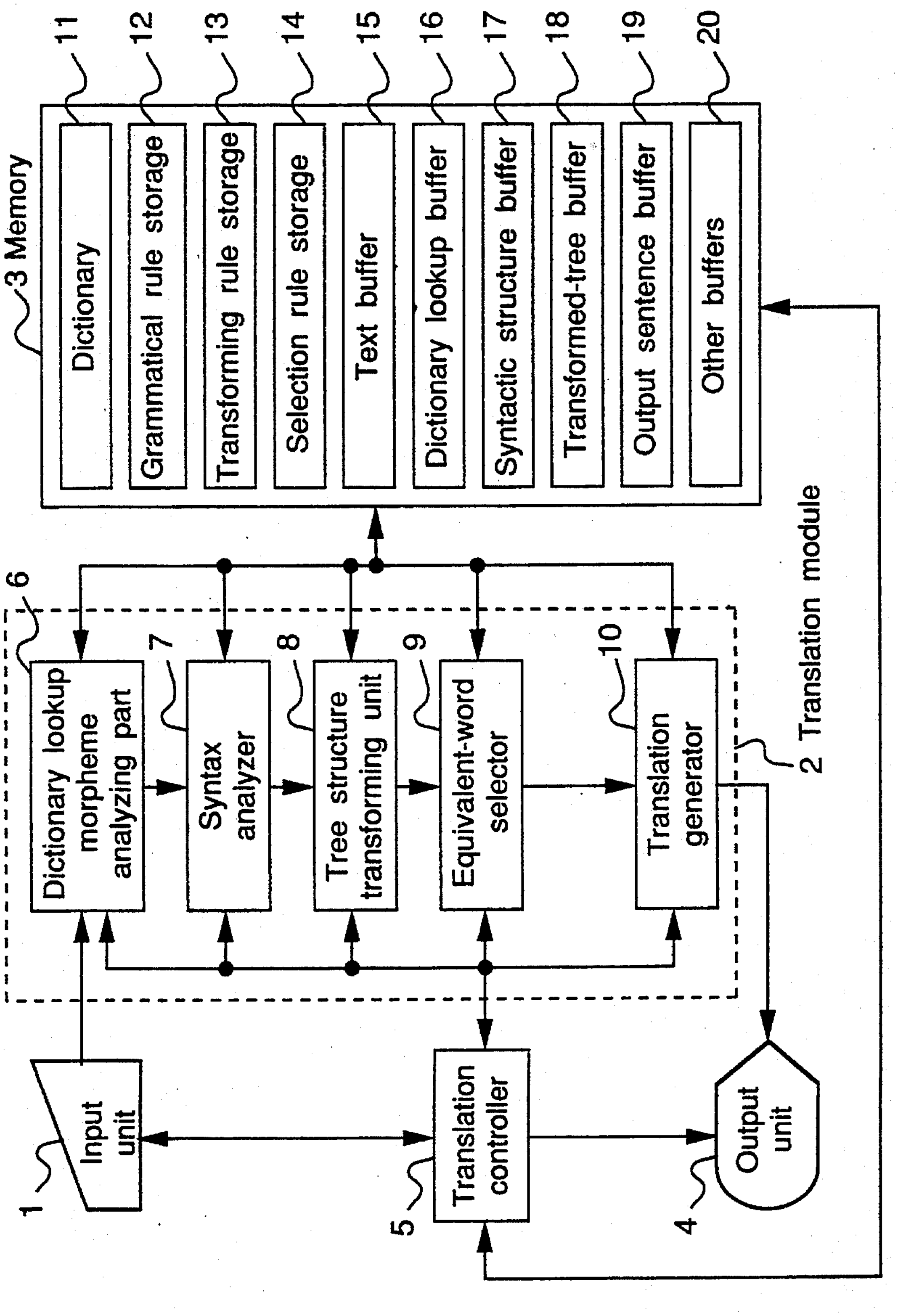
FIG. 1 is a block diagram of a machine translation system according to an embodiment of the present invention.

FIG. 1 is a block diagram of the machine translation system of the present embodiment.

An input unit 1 includes a keyboard, an OCR (Optical Character Reader), and the like. A text in a source language, which will be an object of translation, is input through the input unit 1. A translation module 2 has a dictionary-lookup morpheme analyzing part 6, a syntax analyzer 7, a tree structure transforming unit 8, an equivalent-word selector 9, and a translation generator 10, and performs a translation process on a text inputted from the input unit 1. A memory 3 has a dictionary 11, a grammatical rule storage 12, a transforming rule storage 13 for storing tree-structure transforming rules, an equivalent-word selection rule storage 14 for storing rules for selecting equivalent words in a target language (referred to simply as equivalent words), as well as various types of buffers 15, 16, 17, 18, 19, 20 for temporarily storing information obtained in performing the translation process, as described later. An output unit 4 includes a CRT (Cathode Ray Tube), a printer, and the like, and outputs a translation in the target language obtained by the translation module 2.

A translation controller 5 controls the input unit 1, the translation module 2, the memory 3, and the output unit 4 to perform the translation process.

The grammatical rule storage 12 of the memory 3 store the following grammatical rules.

| | | |
|---|---|---|
| SENTENCE | → | SUBJECT + PREDICATE |
| SUBJECT | → | NOUN PHRASE |
| PREDICATE | → | VERB + NOUN PHRASE |
| NOUN PHRASE | → | PRONOUN |
| NOUN PHRASE | → | ARTICLE + NOUN |
| . . . | → | . . . |

where the above first grammatical rule represents that "A sentence consists of a subject and a predicate."

Figure 2:
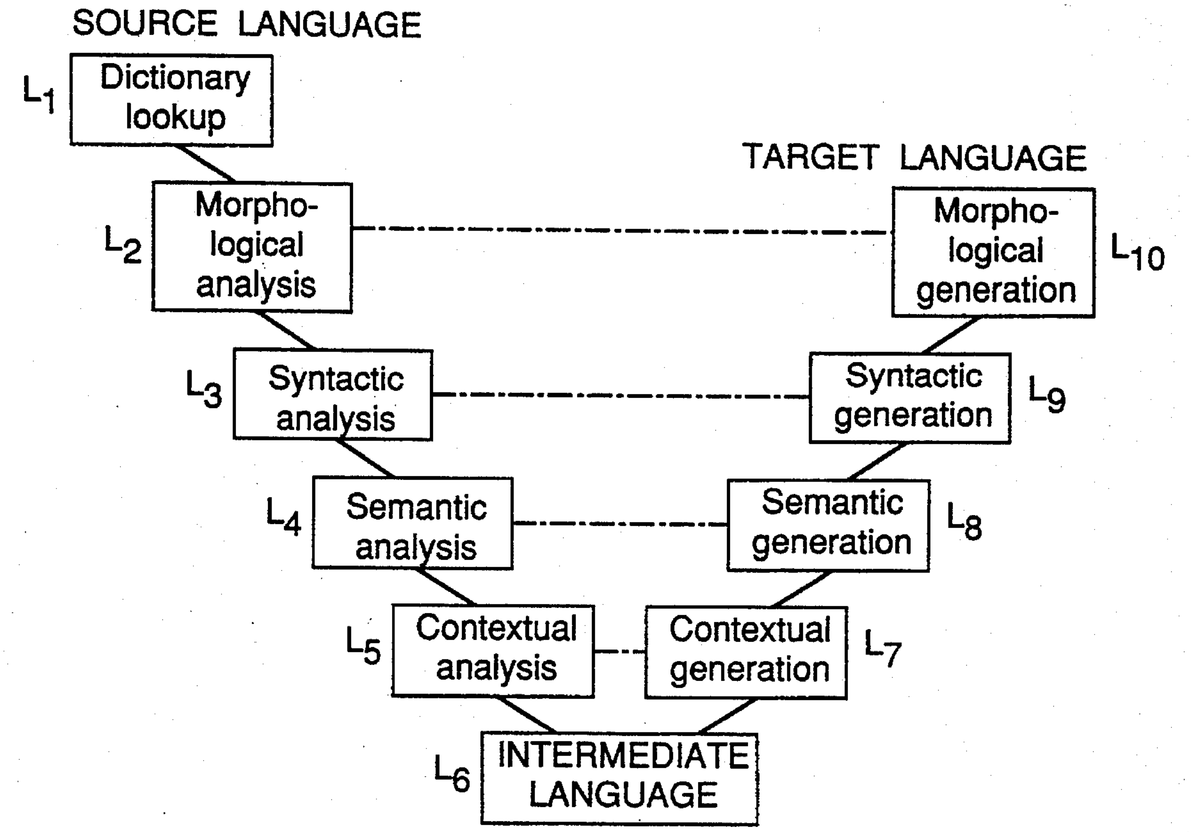
FIG. 2 is an explanatory view of the translation levels.

The translation process executed by the translation module 2 is generally of such levels as shown in FIG. 2. The left half of the figure shows analysis levels in a source language, while the right half shows generation levels in a target language.

If a sentence in a source language is inputted, analysis proceeds through steps of dictionary lookup at analysis level $L_1$, morphological analysis at analysis level $L_2$, syntactic analysis at analysis level $L_3$, . . . .

The machine translation methods are classified roughly into two categories by the analysis levels adopted. One of the two is the pivot method. In this method, analysis is effected up to a concept (referred to as an intermediate language) independent of both a source language and a target language at analysis level $L_6$. This is followed by the steps of contextual generation at generation level $L_7$, semantic generation at generation level $L_8$, syntactic generation at generation level $L_9$, and morphological generation at generation level $L_{10}$. Thus, a sentence in the target language is generated.

The other is the transfer method. In this method, analysis is effected up to any one of the steps of morphological analysis at analysis level $L_2$, syntactic analysis at analysis level $L_3$, semantic analysis at analysis level $L_4$, and contextual analysis at analysis level $L_5$, so that an internal structure in a source language is obtained. Next, the obtained internal structure in the source language is converted into an internal structure in a target language of the equal level, and thereafter a sentence in the target language is generated.

The translation module 2 in the present embodiment is assumed to effect analysis at least up to the syntactic analysis at analysis level $L_3$.

The machine translation system with the above-described arrangement translates a source language into target language through the following operation. In the following description, the source language is English and the target language is Japanese.

Figure 3:
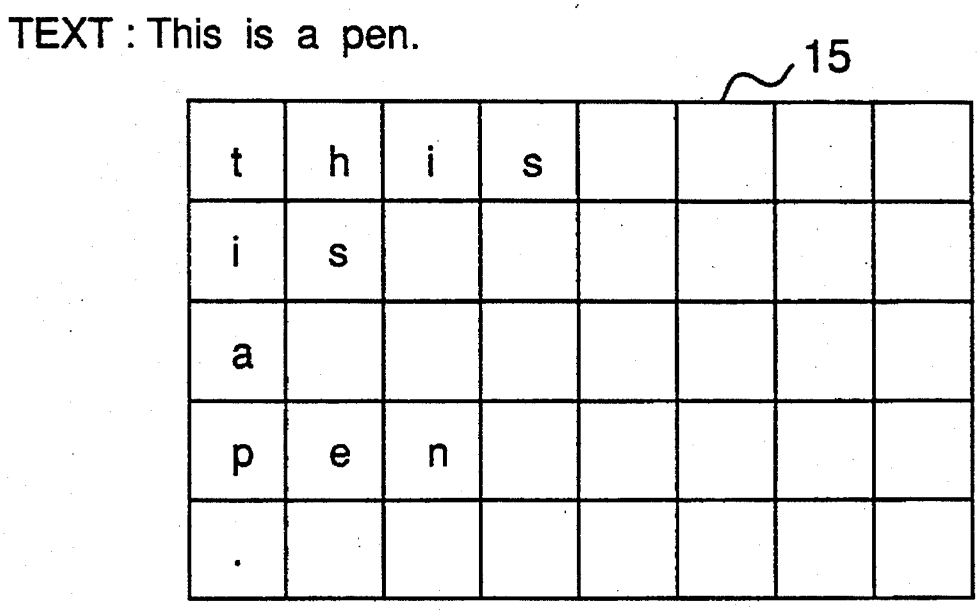
FIG. 3 illustrates a text stored in the text buffer of the machine translation system of FIG. 1.

When an English text "This is a pen." is inputted from the input unit 1 and an instruction for starting the translation operation is issued, the translation operation starts. The input text gets stored in a text buffer 15 of the memory 3 as shown in FIG. 3.

Figure 4:
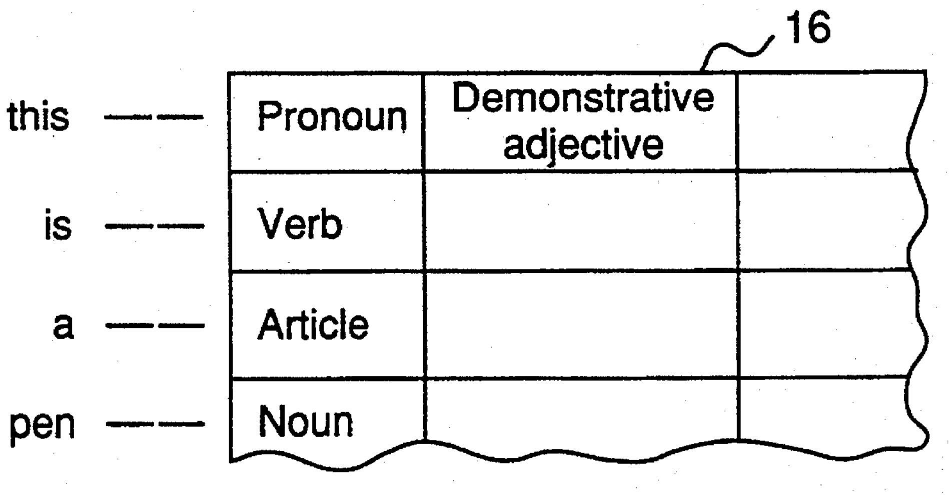
FIG. 4 illustrates part of morphological information stored in a dictionary lookup buffer of the machine translation system of FIG. 1.

Then, under control of the translation controller 5, the text stored in the text buffer 15 is divided into morphemes (hereinafter, referred to as words) by the dictionary lookup morpheme analyzing part 6 of the translation module 2 by using information in the dictionary 11 of the memory 3. As a result, information including parts of speech of the words and Japanese equivalent words of the words is obtained. The information obtained in this way is stored in a dictionary lookup buffer 16 as shown in FIG. 4.

Next, based on both the information stored in the dictionary lookup buffer 16 and the grammatical rules stored in the grammatical rule storage 12, a parse tree representing a relationship among the words is determined by the syntactic parser 7 of the translation module 2, and stored in a syntactic structure buffer 17 as shown in FIG. 5. Subsequently, based on the tree-structure transforming rules stored in the transforming rule storage 13 of the memory 3, a structure of the parse tree of the text stored in the syntactic structure buffer 17 is converted into a case structure tree by the tree structure transforming unit 8. The resulting case structure tree is stored in a converted-tree buffer 18 as shown in FIG. 6.

Next, a Japanese equivalent of each English word to be assigned to each element in the case structure tree is determined by the equivalent-word selector 9 of the translation module 2 by searching the dictionary 11 in a manner as will be detailed later (FIG. 6 illustrates a state that equivalent words have already been assigned to the case structure tree). Then, a Japanese translation is generated by the translation generator 10 based on both the case structure tree and the Japanese equivalent words assigned to the elements of the tree, and stored in an output sentence buffer 19 of the memory 3 as shown in FIG. 7. The thus generated Japanese translation of the English text is outputted by the output unit 4.

Next, contents of the dictionary 11 in the memory 3 and the operation of the equivalent-word selector 9 in the translation module 2 are described in detail.

FIGS. 8 through 19 illustrate examples of the contents of the dictionary 11 for several entry words. Stored in the dictionary 11 are, for each entry, the following pieces of language information: an equivalent-word number, an equivalent word, a semantic attribute code, a surface case pattern number, priority, a case-element number, a case element surface name, a case element preposition, a case element semantic restriction, a subordinate counterpart number, a subordinate counterpart surface name, a subordinate counterpart semantic restriction, and/or other conditions.

The dictionary 11 is so arranged as to be able to process the cooccurrence between a particular pair of [WORD:EQUIVALENT WORD] and another particular pair of [WORD:EQUIVALENT WORD], in the case where two or more English words cooccurring in a dependency relation, when converted into Japanese, would be special equivalent words, or in the case where two or more English words cooccurring in a dependency relation, when converted into Japanese, would cause cooccurrences between their equivalent words to be generated. Note that the capital-letter term [WORD] here indicates an entry word in the dictionary 11. The dictionary 11 is also arranged to set a "single special cooccurrence code" or a "collective special cooccurrence code" to associate the two pairs of [WORD:EQUIVALENT WORD] with each other, and is thereby capable of treating the source language with the above dependency relation between the words being maintained.

It is to be noted that the dependency relation here referred to is a relation between a dominant word and a subordinate word dependent on the dominant word, such as, for example, a relation between a head and its case element, a relation between a modifier and its counterpart's head, etc.

The single special cooccurrence code is a special code intended for cooccurrence processing, and functions to associate a particular pair of [WORD:EQUIVALENT WORD] with another particular pair of [WORD:EQUIVALENT WORD] possible to cooccur with the former pair in one-to-one correspondence. In other words, the single special cooccurrence code serves as an index of a particular pair and is used when "one side that specifies a subordinate counterpart as a dominant (i.e., governing) counterpart" and "the other side that is specified as the subordinate (i.e., governed or dependent) counterpart" cooccur in one-to-one correspondence.

Strictly speaking, since one subordinate-side pair of [WORD:EQUIVALENT WORD] can cooccur with not only a unique dominant-side pair of [WORD:EQUIVALENT WORD] but also any one of a plurality of dominant-side pairs of [WORD:EQUIVALENT WORD], the subordinate-side pair and the dominant-side pair do not necessarily cooccur in one-to-one correspondence. In the present embodiment, however, considering the dominant pair of [WORD:EQUIVALENT WORD] as the center, even a cooccurrence relation of one-to-several correspondence between the subordinate-side pair and the dominant-side pair is referred to as a cooccurrence relation of one-to-one correspondence for convenience' sake.

On the other hand, the collective special cooccurrence code is also a special code intended for cooccurrence processing, and functions to associate a particular dominant-side pair of [WORD:EQUIVALENT WORD] with a set of multiple subordinate-side pairs of [WORD:EQUIVALENT WORD] possible to cooccur with the dominant-side pair. This code is an equivalent to the index of a set of particular pairs of [WORD:EQUIVALENT WORD] and is used when the cooccurrence relation between "one side that specifies a subordinate counterpart as a dominant counterpart" and "the other side that is specified as a subordinate counterpart" is in one-to-several correspondence.

It is noted that the "WORD" referred to here means one treated as an "entry word" in the dictionary 11 as described above and that the "entry word" is not necessarily composed of only one word.

Also, the dictionary 11 is built up based on the following assumptions:

(a) A word serving as a head can specify the case element as its subordinate counterpart; i.e., a head has a right to govern the case element;

(b) A modifier can specify a head as its subordinate counterpart; i.e., a modifier has a right to govern a head; and (c) A semantic code is described in a four-digit number in the field of "SEMANTIC ATTRIBUTE CODE," its type being indicated by a head-digit number as follows:

| | | |
|---|---|---|
| •General semantic code | → | Head digit of number 0–7 |
| •Single special cooccurrence code | → | Head digit of number 8 |
| •Collective special cooccurrence code | → | Head digit of number 9 |

Hereinbelow, by way of concrete examples, the arrangement and function of the dictionary 11 are described in detail. The source language is English and the target language is Japanese in the following examples and Japanese words are expressed in Roman characters in the specification although expressed in kanji and hirakana in the drawings.

<When the semantic code is a single special cooccurrence code>

Now assume that a verb "give" and a noun "attention" in the English language cooccur and that when they are converted into the Japanese language, cooccurring equivalent words of "CHUI (attention) WO HARAU (give)" are obtained. For processing such a cooccurrence relation of one-to-one correspondence, the single special cooccurrence code is set.

First, as shown in FIG. 9, a single special cooccurrence code "8000" unique to a pair of [attention:CHUI] is written in the field of "SEMANTIC ATTRIBUTE CODE" in the row for the equivalent word "CHUI" having equivalent word No. "000" of the entry word "attention" (noun). As obvious from this, the semantic attribute of an equivalent word of an entry word is written to the field of "SEMANTIC ATTRIBUTE CODE". Next, as shown in FIG. 8, the single special cooccurrence code "8000" that designates the cooccurring counterpart pair of [attention:CHUI] is written in the field of "CASE ELEMENT Semantic restriction" in the row for the equivalent word "(~WO) HARAU" of equivalent word No. "060" of the entry word "give" (verb).

It is noted that surface case pattern No. "01" in FIG. 8 represents a pattern "SUBJECT+VERB+NOUN PHRASE+PREPOSITIONAL PHRASE." Also, surface case pattern No. "00" in FIG. 9 represents a pattern "NOUN, NO PATTERN (HAVING NO CASE)."

By setting the single special cooccurrence code in this way, a cooccurrence relation of one-to-one correspondence between the pair of [give:(~WO) HARAU] and the pair of [attention:CHUI] is shown via the single special cooccurrence code "8000" unique to the pair of [attention:CHUI].

<When the semantic code is a collective special cooccurrence code (Case 1)>

Now assume that a verb "make" and any one of a plurality of nouns "adjustment," "analysis," "assumption," and "preparation" in the English language cooccur and, when converted into the Japanese language, result in the following equivalent words:

(i) When the sentence is of the active voice and when the nouns are accompanied by no modifier,
"CHOUSEI (adjustment) SURU (make)"
"BUNSEKI (analysis) SURU (make)"
"KATEI (assumption) SURU (make)"
"JUMBI (preparation) SURU (make)"

(ii) When the sentence is of the active voice and when the nouns are accompanied by a modifier,
"CHOUSEI (adjustment) WO SURU (make)"
"BUNSEKI (analysis) WO SURU (make)"
"KATEI (assumption) WO SURU (make)"
"JUMBI (preparation) WO SURU (make)"

(iii) When the sentence is of the passive voice,
"CHOUSEI (adjustment) GA OKONAWARERU (make)"
"BUNSEKI (analysis) GA OKONAWARERU (make)"
"KATEI (assumption) GA OKONAWARERU (make)"
"JUMBI (preparation) GA OKONAWARERU (make)"

For processing such a cooccurrence relation of one-to-several correspondence in association with a verb "make," the collective special cooccurrence code is set.

First, as shown in FIG. 11, in the field of "SEMANTIC ATTRIBUTE CODE" in the row for equivalent word No. "000" representing the equivalent word "CHOUSEI" of the entry word "adjustment" (noun), the following collective special cooccurrence code numbers are written.

(1) A collective special cooccurrence code "9000" representing a set of pairs of [ENTRY WORD:EQUIVALENT WORD] that cooccur with the pair of [make: (~)SURU ];

(2) A collective special cooccurrence code "9001" representing a set of pairs of [ENTRY WORD:EQUIVALENT WORD] that cooccur with the pair of [make: (~WO) SURU]; and (3) A collective special cooccurrence code "9002" representing a set of pairs of [ENTRY WORD:EQUIVALENT WORD] that cooccur with the pair of [make: (~GA) OKONAWARERU], where the set of pairs of [ENTRY WORD:EQUIVALENT WORD] is a set consisting of pairs of:
[adjustment:CHOUSEI], [analysis: BUNSEKI]
[assumption: KATEI], and [preparation: JUMBI].

It is noted that surface case pattern No. "00" in FIG. 11 represents a case pattern "NOUN, NO PATTERN (HAVING NO CASE)."

Similarly, as shown in FIG. 12 through FIG. 14, the collective special cooccurrence code "9000" in the above-listed (1), the collective special cooccurrence code "9001" in (2), and the collective special cooccurrence code "9002" in (3) are written in the field of "SEMANTIC ATTRIBUTE CODE" in the row for the equivalent word "BUNSEKI" of equivalent-word No. "000" of the entry word "analysis" (noun); in the row for equivalent-word No. "000" representing the equivalent word "KATEI" of the entry word "assumption" (noun); and in the row for the equivalent word "JUMBI" of equivalent-word No. "000" of the entry word "preparation" (noun), respectively.

It is noted that surface-case pattern No. "00" in FIG. 12 represents a pattern "NOUN, NO PATTERN (HAVING NO CASE)." Also, surface-case pattern No. "00" in FIG. 13 represents a pattern "NOUN, NO PATTERN (HAVING NO CASE)," and surface-case pattern No. "01" represents a pattern "NOUN+THAT-CLAUSE." Likewise, surface-case pattern No. "00" in FIG. 14 represents a pattern "NOUN, NO PATTERN (HAVING NO CASE)", and surface-case pattern No. "02" represents a pattern "NOUN+PREPOSITIONAL PHRASE."

Next, as shown in FIG. 10, collective special cooccurrence codes are written in the field of "CASE ELEMENT Semantic restriction" of the entry word "make" (verb) as follows:

(1) For the equivalent word "(~)SURU" of equivalent-word No. "015," a collective special cooccurrence semantic code "9000" specifying the set of pairs of [ENTRY WORD:EQUIVALENT WORD] that cooccur with the pair of [make:(~)SURU] is written;

(2) For the equivalent word "(~WO) SURU" of equivalent-word No. "020," a collective special cooccurrence semantic code "9001" specifying the set of pairs of [ENTRY WORD:EQUIVALENT WORD] that cooccur with the pair of [make:(~WO) SURU] is written; and (3) For the equivalent word "(~GA) OKONAWARERU" of equivalent-word No. "025," a collective special cooccurrence semantic code "9002" specifying the set of pairs of [ENTRY WORD:EQUIVALENT WORD] that cooccur with the pair of [make:(~GA) OKONAWARERU] is written.

It is noted that surface-case pattern No. "00" in FIG. 10 represents a pattern "SUBJECT+VERB+NOUN PHRASE."

By setting the collective special cooccurrence codes in this way, the following cooccurrence relations in association with a verb "make" can be shown:

(1) A cooccurrence relation of one-to-several correspondence between the pair of [make:(~)SURU] and the set consisting of pairs of [adjustment:CHOUSEI], [analysis:BUNSEKI], [assumption:KATEI], and [preparation:JUMBI] via the collective special cooccurrence code "9000";

(2) A cooccurrence relation of one-to-several correspondence between the pair of [make:(~WO) SURU] and the foregoing set of pairs of [ENTRY WORD:EQUIVALENT WORD] via the collective special cooccurrence code "9001"; and (3) A cooccurrence relation of one-to-several correspondence between the pair of [make:(~GA) OKONAWARERU] and the foregoing set of pairs of [ENTRY WORD:EQUIVALENT WORD] via the collective special cooccurrence code "9002."

<When the semantic code is a collective special cooccurrence code (Case 2)>

Now assume that an adjective "high" and any one of a plurality of nouns "coupon," "interest," "speed," and "tension" in the English language cooccur and, when converted into the Japanese language, result in the following cooccurring equivalent words:

"KOU (high) RIMAWARI (coupon)"

"KOU (high) KINRI (interest)"

"KOU (high) SOKU (speed)"

"KOU (high) ATSU (tension), where the field is electrical."

For processing such a cooccurrence relation of one-to-several correspondence in association with an adjective "high," the collective special cooccurrence code is set.

First, as shown in FIG. 16, a collective special cooccurrence code "9010" appointing a set of pairs of [ENTRY WORD:EQUIVALENT WORD] that cooccur with the pair of [high:KOU] is written as a semantic attribute code in the row for the equivalent word "RIMAWARI" of equivalent-word No. "020" of the entry word "coupon" (noun).

In this case, the set of pairs of [ENTRY WORD:EQUIVALENT WORD] is a set consisting of the following pairs:

[coupon:RIMAWARI], [interest:KINRI]
[speed:SOKU], and [tension:ATSU].

Similarly, as shown in FIG. 17 through FIG. 19, the collective special cooccurrence code "9010" is also written in the field of "SEMANTIC ATTRIBUTE CODE" in the rows for the equivalent word "KINRI" of equivalent-word No. "010" of the entry word "interest" (noun), for the equivalent word "SOKU" of equivalent-word No. "020" of the entry word "speed" (noun), and for the equivalent word "ATSU" of equivalent-word No. "030" of the entry word "tension" (noun), respectively.

It is noted that surface-case pattern No. "00" in FIG. 16 through FIG. 19 represents a pattern "NO PATTERN (HAVING NO CASE)."

Next, as shown in FIG. 15, the collective special cooccurrence code "9010" specifying the set of pairs of [ENTRY WORD:EQUIVALENT WORD] that cooccur with the pair of [high:KOU] is written in the field of "CASE-ELEMENT Semantic restriction" in the row for the equivalent word "KOU" of equivalent-word No. "040" of the entry word "high" (adjective).

Thus, the cooccurrence relation of one-to-several correspondence between the pair of [high:KOU] and the set of pairs of [coupon:RIMAWARI], [interest:KINRI], [speed:SOKU], and [tension:ATSU] can be shown via the collective special cooccurrence code "9010."

It is noted that surface-case pattern No. "00" in FIG. 15 represents a pattern "ADJECTIVE, NO PATTERN (HAVING NO CASE)."

The following describes the operation of selecting an equivalent word from the dictionary 11 having the above-described contents by the equivalent-word selector 9 of the translation module 2.

Figure 20:
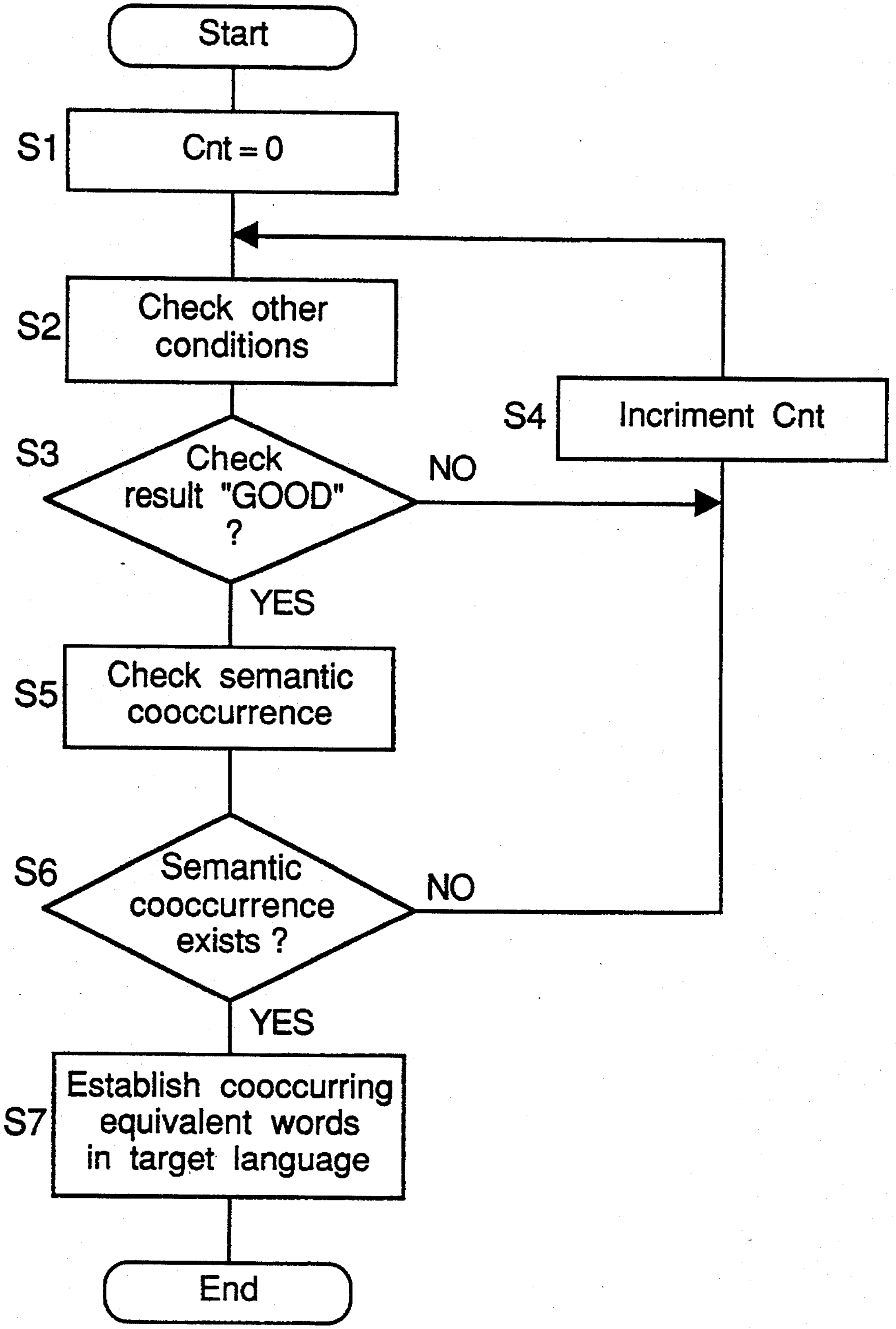
FIG. 20 is a flow chart of the equivalent-word selection operation carried out by an equivalent-word selector of the machine translation system of FIG. 1.

FIG. 20 is a flow chart of the equivalent-word selection operation performed by the equivalent-word selector 9 under control of the translation controller 5. Hereinbelow, by taking an example in which cooccurring equivalent words are selected by using the single special cooccurrence code, the equivalent-word selection operation is described with reference to FIG. 20 as well as FIG. 1, FIG. 8, and FIG. 9.

Assume that a text inputted from the input unit 1 is:

TEXT 1: "He gave attention to it."

It is also assumed that the conversion process for the translation of the TEXT 1 has been completed by the tree structure transforming unit 8 in the translation module 2, so that a case structure tree originating from the TEXT 1 has been obtained and stored in the converted-tree buffer 18.

At step S1, a "0" is set to an equivalent-word pointer Cnt, which indicates the position of an equivalent word of the entry word "give" for the head "gave" of the TEXT 1 in the dictionary 11 using the priority as an index.

As a result, in the area for the entry word "give" of the dictionary 11, the row for the equivalent word "(~WO) HARAU" of equivalent-word No. "060" having a "00" written in the field of "PRIORITY" is designated.

At step S2, by referencing the field of "OTHER CONDITIONS" in the row for the pertinent equivalent word, it is checked whether or not the TEXT 1 meets any other condition that gives any special limitation on the case element other than the semantic cooccurrence.

At step S3, it is determined whether or not the result of the check at step S2 is "GOOD" (no condition that gives any limitation is applicable). If it is "GOOD," the program goes to step S5, while if not, the program goes to step S4.

In this example, the field of "OTHER CONDITIONS" in the designated row (the row associated with the equivalent word "(~WO) HARAU") is blank (not shown), so that there is no condition that gives any special limitation on the case element. Accordingly, the equivalent word is determined at step S3 to be "GOOD," and the program goes to step S5.

At step S4, the content of the equivalent-word pointer Cnt is incremented by one. Then, a row assigned to an equivalent word having the next priority is specified and the program returns to step S2.

At step S5, it is checked whether or not the single special cooccurrence code or the collective special cooccurrence code written in the field of "CASE-ELEMENT Semantic restriction" in the row assigned to the pertinent equivalent word coincides with the single special cooccurrence code or the collective special cooccurrence code written in the field of "SEMANTIC ATTRIBUTE CODE" of the entry word "attention" which is a counterpart in a dependency relation with the entry word "give."

Through the check at step S5, it is checked at step S6 whether or not there exists a semantic cooccurrence. If the discrimination result is "YES,", the program goes to step S7. On the other hand, if it is "NO," the program goes to step S4, at which the content of the equivalent-word pointer Cnt is incremented by one and a row for a further equivalent word having the next priority, if any, is specified.

In this example, the single special cooccurrence code "8000" written in the field of "CASE-ELEMENT Semantic restriction" in the row for the equivalent word "(~WO) HARAU" of the entry word "give" coincides with the single special cooccurrence code "8000" written in the field of "SEMANTIC ATTRIBUTE CODE" in the row for the equivalent word "CHUI" of the entry word "attention." Accordingly, in the translation process of the TEXT 1, the semantic cooccurrence is determined to exist at step S6, and the program goes to step S7.

At step S7, since the pair of [give:(~WO) HARAU], which is a dominant-side pair having a right to designate its cooccurring subordinate-side counterpart pair, and the pair of [attention:CHUI], which is the subordinate-side pair to be designated by its cooccurring dominant-side counterpart pair, are made to correspond to each other by the same single special cooccurrence code "8000," "CHUI" is established as the Japanese equivalent word of the English entry word "attention" that cooccurs with the Japanese equivalent word "(~WO) HARAU" of the entry word "give" (verb).

In this way, the cooccurring Japanese equivalent "CHUI WO HARAU" for the words "give" and "attention" cooccurring in one-to-one correspondence is determined. Thus, the program ends the equivalent-word selection operation.

When equivalent words of all the words that are elements of the case structure tree originating from the text and stored in the converted-tree buffer 18 are obtained in the manner as described above, the following translation of the text:

TRANSLATION 1: "KARE HA, SORE NI CHUI WO HARATTA."

is generated by the translation generator 10 of the translation module 2, and stored in the output sentence buffer 19 of the memory 3 and further outputted from the output unit 4. The underlined portion of the translation corresponds to the cooccurring equivalent words.

Next, an example in which cooccurring equivalent words are selected via the collective special cooccurrence code is described below with reference to FIGS. 1, 10–19, and 20.

In this example, assume that the following text is inputted.

TEXT 2: "He made an adjustment."

It is also assumed that a case structure tree originating from the TEXT 2 has been already obtained and stored in the converted-tree buffer 18, as in the foregoing example.

At step S1, with a "0" set to the equivalent-word pointer Cnt, a row having a priority "00" for the equivalent word "(~) SURU" of equivalent-word No. "015" of the entry word "make" is designated in the dictionary 11.

Subsequently, a check on the other conditions is executed at step S2. Conditions that "Only for active voice" and "Case-element modification not permitted" are written in the field of "OTHER CONDITIONS" in the row designated in the preceding step. The TEXT 2 is of the active voice, where the word "adjustment," which is a case element of the word "made" in the TEXT 2, is not accompanied by a modifier. That is, the TEXT 2 meets the other conditions. Accordingly, at step S3, it is determined that the result of the other conditions check is "GOOD."

Next, the semantic cooccurrence check is executed at step S5. The collective special cooccurrence code "9000" written in the field of "CASE-ELEMENT Semantic restriction" in the designated row, that is, the row for the equivalent word "(~)SURU" of the entry word "make", coincides with the collective special cooccurrence code "9000" written in the field of "SEMANTIC ATTRIBUTE CODE" in the row for the equivalent word "CHOUSEI" of the entry word "adjustment." Accordingly, at step S6, it is determined that there exists a semantic cooccurrence in the TEXT 2, so that the equivalent word "CHOUSEI" of the word "adjustment" is established as the equivalent word that cooccurs with the equivalent word "(~)SURU" of the word "make" (verb) at step S7.

Then, a translation of the TEXT 2

TRANSLATION 2: "KARE HA, CHOUSEI SHITA."

is generated by the translation generator 10 of the translation module 2, and stored in the output sentence buffer 19 of the memory 3 and is further outputted from the output unit 4.

Also, by similar processing, any one of the pairs of [analysis:BUNSEKI], [assumption:KATEI], and [preparation:JUMBI] that cooccurs with the pair of [make:(~)SURU] can be established according to the text content via the collective special cooccurrence code "9000."

Accordingly, also when the following texts 3–5, which are of the active voice and in which a noun that is a case element of the word "made" is accompanied by no modifier, are inputted, their respective translations 3–5 are generated based on the cooccurrence relation as described above:

TEXT 3: "He made an analysis carefully."

TRANSLATION 3: "KARE HA, CHUIBUKAKU BUNSEKI SHITA."

TEXT 4: "He made an assumption."

TRANSLATION 4: "KARE HA, KATEI SHITA."

TEXT 5: "He made preparations quickly."

TRANSLATION 5: "KARE HA, ISOIDE JUMBI SHITA."

Next, another example in which cooccurring equivalent words are selected by using the collective special cooccurrence code is described with reference to FIGS. 1, 10–19, and 20.

Assume that the text in this example is

TEXT 6: "He made an assumption that she ate it."

First, with a "0" set to the equivalent-word pointer Cnt, a row having a priority "00" for the equivalent word "(~)SURU" of equivalent-word No. "015" of the entry word "make" is designated in the dictionary 11, at step S1.

Subsequently, at step S2, the other-condition check is executed. In this example, TEXT 6 is of the active voice but the word "assumption" that is a case element of the word "made" is accompanied by a modifier consisting of a THAT-clause. Accordingly, as the result of the other-condition check, the equivalent word having the priority "00" is determined to be "NO GOOD" at step S3. Then, the content of the equivalent-word pointer Cnt is incremented, and a "01" is set at step S4.

In this way, the row for the equivalent word "(~WO) SURU" of equivalent-word No. "020" having the second highest priority "01" is designated.

Again, the other-condition check is executed at step S2. A condition that "Only for active voice" has been written in the field of "OTHER CONDITIONS" in the designated row. TEXT 6 is of the active voice. Therefore, as a result of the other-condition check, the equivalent word in the designated row is determined to be "GOOD," at step S3.

Next, the semantic cooccurrence check is executed at step S5. The collective special cooccurrence code "9001" written in the field of "CASE-ELEMENT Semantic restriction" in the row for the equivalent word "(~WO) SURU" of equivalent-word No. "020" of the word "make" coincides with the collective special cooccurrence code "9001" written in the field of "SEMANTIC ATTRIBUTE CODE" in the row for the equivalent word "KATEI" of the entry word "assumption." Accordingly, the Japanese equivalent word "KATEI" of the word "assumption" that cooccurs with the Japanese equivalent word "(~WO) SURU" of the word "make" (verb) is established at step S7.

Thereafter, the following translation of TEXT 6 is obtained by the translation generator 10 of the translation module 2.

TRANSLATION 6: "KARE HA, KANOJO GA SORE WO TABERU TO IU KATEI WO SHITA."

Also, by similar processing, any one of the pairs of [adjustment:CHOUSEI], [analysis:BUNSEKI], and [preparation:JUMBI] that cooccurs with the pair of [make:(~WO) SURU] can be established according to the text via the collective special cooccurrence code "9001."

Accordingly, also when the following texts 7–9, which are of the active voice and in which a noun that is the case element of the word "made" is accompanied by some modifier, are inputted, their corresponding translations 7–9 are generated based on the cooccurrence relation as described above:

TEXT 7: "He made a few minor adjustments."

TRANSLATION 7: "KARE HA, 2, 3 NO MAINANA CHOUSEI WO SHITA."

TEXT 8: "He made a careful analysis."

TRANSLATION 8: "KARE HA, CHUIBUKAI BUNSEKI WO SHITA."

TEXT 9: "He made preparations for the party."

TRANSLATION 9: "KARE HA, PATEI NO JUMBI WO SHITA."

When a text is of the passive voice, the content of the equivalent-word pointer Cnt is incremented until it becomes "02" through the other-condition check at steps S2 and S3. As a result, a row for the equivalent word "(~GA) OKONAWARERU" of equivalent-word No. "025" of the entry word "make" in which "Only for passive voice" has been written in the field of "OTHER CONDITIONS", is designated.

Then, by the same processing as in the collective special cooccurrence codes "9000" and "9001," any one of the pairs of [adjustment:CHOUSEI], [analysis:BUNSEKI], [assumption:KATEI], and [preparation:JUMBI] with which the pair of [make:(~GA) OKONAWARERU] cooccurs in one-to-several correspondence is established according to the text via the collective special cooccurrence code "9002."

Accordingly, when the following texts 10–13, which are of the passive voice, are inputted, their corresponding translations 10–13 are generated based on the cooccurrence relation as described above:

TEXT 10: "A fine adjustment should be made."

TRANSLATION 10: "SEIMITSUNA CHOUSEI GA OKONAWARERU BEKIDEARU."

TEXT 11: "A careful analysis was made."

TRANSLATION 11: "CHUIBUKAI BUNSEKI GA OKONAWARETA."

TEXT 12: "A false assumption was made."

TRANSLATION 12: "MACHIGATTA KATEI GA OKONAWARETA."

TEXT 13: "Final preparations were made."

TRANSLATION 13: "SAISHUTEKINA JUMBI GA OKONAWARETA"

Next, an example of cooccurrence relation in association with an adjective is described.

Assume that the text is

TEXT 14: "high coupon."

With a "0" set to the equivalent-word pointer Cnt that specifies the position of an equivalent word of an entry word in the dictionary 11, the entry word being the modifier "high" of TEXT 14 in this case, a row for the equivalent word "KOU" of equivalent-word No. "040" having a priority "00" is designated.

Then, by similar processing to that for the foregoing entry word "make," a Japanese equivalent word "RIMAWARI" of the English word "coupon" that cooccurs with the Japanese equivalent word "KOU" of the word "high" is established according to TEXT 14 via the collective special cooccurrence code "9010."

Accordingly, the following translation 14 of the above TEXT 14 is generated:

TRANSLATION 14: "KOURIMAWARI"

Similarly, when the following texts 15–17 including the word (adjective) "high" are inputted, their respective translations 15–17 are generated based on the cooccurrence relation:

TEXT 15: "high interest"

TRANSLATION 15: "KOUKINRI"

TEXT 16: "high speed"

TRANSLATION 16: "KOUSOKU"

TEXT 17: "high tension"

TRANSLATION 17: "KOUATSU"

As described above, in the dictionary 11 of the memory 3 of the machine translation system of the present embodiment, a single special cooccurrence code representing that two pairs of [ENTRY WORD:EQUIVALENT WORD] have a cooccurrence relation of one-to-one correspondence is written in both an area for a dominant-side pair of [ENTRY WORD:EQUIVALENT WORD] and another area for a subordinate-side pair of [ENTRY WORD:EQUIVALENT WORD] having a dependency relation with the dominant-side pair of [ENTRY WORD:EQUIVALENT WORD]. Besides, when there are a plurality of subordinate pairs of [ENTRY WORD:EQUIVALENT WORD] possible to cooccur with the dominant-side pair of [ENTRY WORD:EQUIVALENT WORD], a collective special cooccurrence code representing that they are in a cooccurrence relation of one-to-several correspondence is written in the area of each pair of [ENTRY WORD:EQUIVALENT WORD].

Further, by the equivalent-word selector 9 provided in the translation module 2, when a dominant word and a subordinate word having a dependency relation with the dominant word cooccur, a pair of [ENTRY WORD:EQUIVALENT WORD] relating to one of the dominant and subordinate word is retrieved by using as an index the single special cooccurrence code or the collective special cooccurrence code written in the area for the counterpart pair of [ENTRY WORD:EQUIVALENT WORD] in the dictionary 11, so that cooccurring equivalent words are obtained.

Therefore, according to the present embodiment, the following various advantages can be offered.

In the dictionary 11 of the present embodiment, as described above, the cooccurrence relation of the words having a dependency relation, i.e., a dominant-subordinate relation is shown by associating the dominant-side pair of [WORD:EQUIVALENT WORD] with the subordinate-side pair of [WORD:EQUIVALENT WORD] by a simple code, i.e. one single special cooccurrence code or collective special cooccurrence code.

Accordingly, unlike the conventional method in which "composite entry words" are registered, creation of cooccurrence information and its maintenance can be easily accomplished by adding and/or deleting the single special cooccurrence code or the collective special cooccurrence code. As a result, it becomes possible to save computation resources required for the creation and maintenance of the cooccurrence information.

Also, while the "semantic attributes" are imparted to the result of classification of semantic concepts, the single special cooccurrence code or the collective special cooccurrence code is imparted to the cooccurrence relation between special pairs of [WORD:EQUIVALENT WORD], thus easy to use.

More specifically, when one "semantic attribute" is imparted to a plurality of pairs of [WORD:EQUIVALENT WORD] to represent a semantic concept that comprehends the plurality of pairs of [WORD:EQUIVALENT WORD], it is difficult to grasp contents of a set of the pairs of [WORD EQUIVALENT WORD] all represented by one "semantic attribute," because of the fact that the semantic concept itself is abstract. Therefore, in using the "semantic attribute" to describe semantic restrictions among pairs of [WORD-:EQUIVALENT WORD], it is difficult to assume how adversely other cooccurrence relations may be affected. In contrast to this, in the present embodiment, the single special cooccurrence code or the collective special cooccurrence code represents only the cooccurrence relation among particular pairs of [WORD:EQUIVALENT WORD], so that other cooccurrence relations will not be affected adversely, but that fine cooccurrence processing can be accomplished.

Furthermore, in the dictionary 11, words in a cooccurrence relation are not registered in a fixed state as in the form of "composite entry words." Therefore, according to the present embodiment, even when any modifier has interrupted the cooccurring words, the words can be correctly translated with recognition of the cooccurrence relation between the words. Besides, even when a phrase consisting of cooccurring words has changed in voice or in the order of the words, the words can be correctly translated through recognition of the cooccurrence relation.

Yet further, as described above, since not only the "entry word" of a counterpart of a specific word but also the pair of [ENTRY WORD:EQUIVALENT WORD] for the counterpart is specified by the single special cooccurrence code or the collective special cooccurrence code, translation of the cooccurring words can be ensured so that a correct translation in the target language can be obtained.

In the present embodiment, English and Japanese are used as the source language and the target language, respectively, although it will be easily understood that other languages may be used as the source and target languages.

Second Embodiment

In this embodiment, an information retrieval system using the special cooccurrence processing method of the present invention is described.

Figure 21:
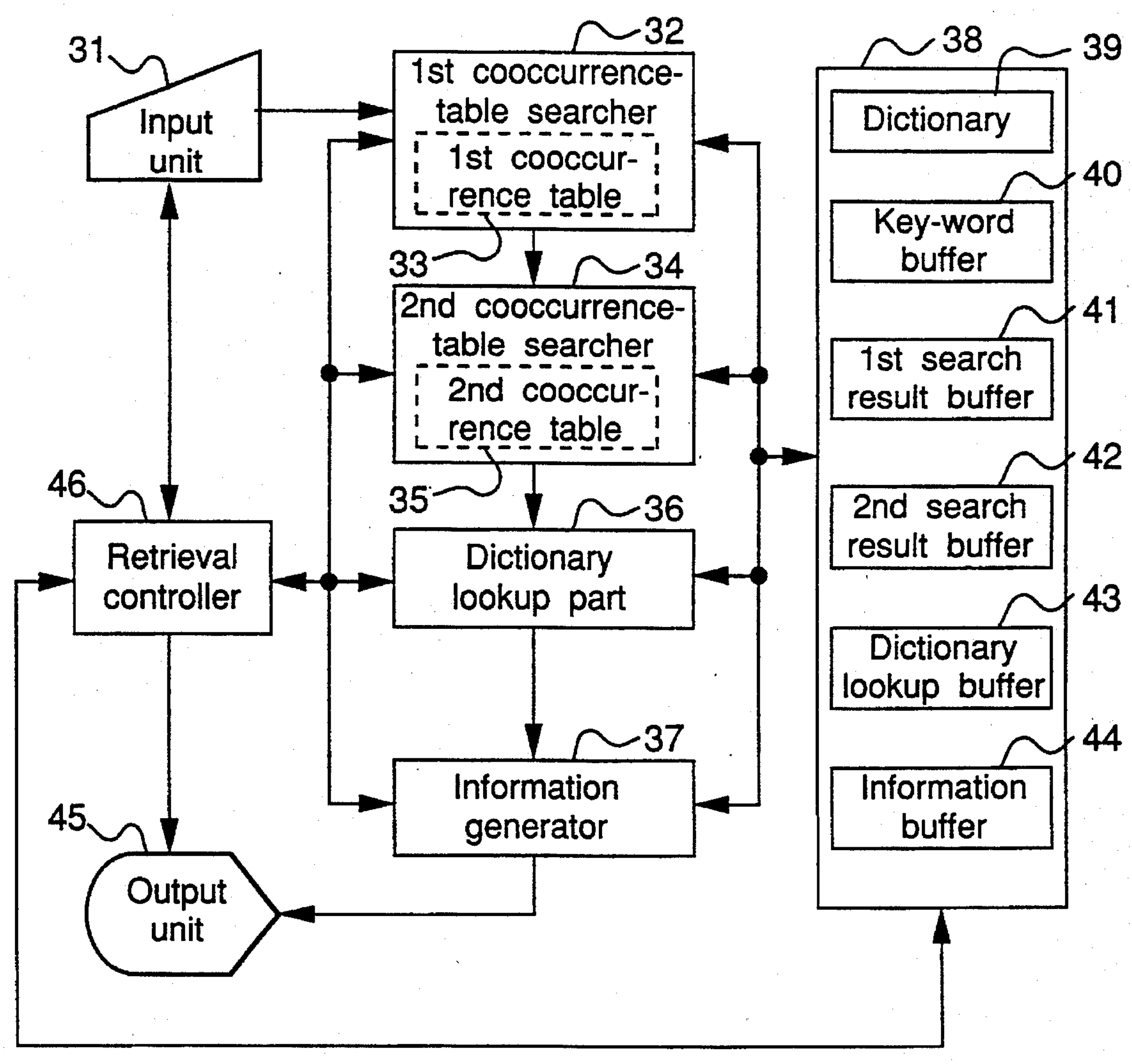
FIG. 21 is a block diagram of an information retrieval system according to another embodiment of the present invention.

FIG. 21 is a block diagram of the information retrieval system of the present embodiment. This information retrieval system identifies an input key word and retrieves and outputs cooccurrence information relating to the key word.

An input unit 31 includes a keyboard and the like to input a key word. A key word inputted from the input unit 31 is stored in a key-word buffer 40 of a memory 38.

A first cooccurrence table searcher 32 contains a first cooccurrence table 33 whose contents are shown in FIG. 22, and searches for the single special cooccurrence code or the collective special cooccurrence code as described in the first embodiment, based on the key word. Then, the obtained single special cooccurrence code or collective special cooccurrence code is stored in a first search result buffer 41 of the memory 38. A second cooccurrence table searcher 34 contains a second cooccurrence table 35 whose contents are shown in FIG. 23, and searches for a cooccurring counterpart word in a dependency relation with the key word, based on the single special cooccurrence code or the collective special cooccurrence code stored in the first search result buffer 41. Then, the obtained cooccurring word is stored in a second search result buffer 42 of the memory 38.

A dictionary lookup part 36 searches a dictionary 39 based on the contents stored in the key-word buffer 40, the first search result buffer 41, and the second search result buffer 42 of the memory 38. Then, cooccurring equivalent words in the second language of the key word and its cooccurring counterpart word are obtained and stored in a dictionary lookup buffer 43. On the basis of the contents of the dictionary lookup buffer 43, an information generator 37 generates cooccurrence information that is information relating to the key word and its cooccurring counterpart word, and stores the information in an information buffer 44.

An output unit 45 includes a CRT, a printer, and the like, and outputs the cooccurrence information generated by the information generator 37. A retrieval controller 46 controls the input unit 31, the first cooccurrence table searcher 32, the second cooccurrence table searcher 34, the dictionary lookup part 36, the information generator 37, the memory 38, and the output unit 45, to execute the retrieval of cooccurrence information.

In this example, the dictionary 39 of the memory 38 has the same arrangement as the dictionary 11 of the machine translation system in the first embodiment.

The arrangement of the first cooccurrence table 33 is as follows.

FIG. 22 illustrates the arrangement of the first cooccurrence table 33.

In a first field $f_1 1$, entry words extracted from the dictionary 39 are registered. In a second field $f_1 2$, the single special cooccurrence codes and/or the collective special cooccurrence codes that associate the entry words registered in the first field $f_1 1$ with words having a dominant-subordinate relation therewith are registered. These single special cooccurrence codes and collective special cooccurrence codes are extracted from the field of "CASE-ELEMENT Semantic restriction," the field of "SUBORDINATE-COUNTERPART Semantic restriction," and the field of "SEMANTIC ATTRIBUTE CODE" of the dictionary 39. Further, in a third field $f_1 3$, parts of speech of the entry words stored in the first field $f_1 1$ are stored. The parts of speech are extracted from the parts of speech added to the entry words of the dictionary 39.

In the field $f_1 3$ of the first cooccurrence table in FIG. 22, a symbol "AJ" represents an adjective, a symbol "NN" represents a noun, and a symbol "VB" represents a verb. Also, a mark "*" added to a part of speech registered in the third field $f_1 3$ represents that the corresponding word is a dominant word having the right to govern its cooccurring counterpart.

In other words, when the single special cooccurrence code or the collective special cooccurrence code is extracted from the field of "CASE ELEMENT Semantic restriction" or the field of "SUBORDINATE COUNTERPART Semantic restriction" of the dictionary 39, the entry word is a dominant or governing word. On the other hand, when the single special cooccurrence code or the collective special cooccurrence code is extracted from the field of "SEMANTIC ATTRIBUTE CODE," the entry word is a subordinate word dependent on the dominant word.

FIG. 23 illustrates the arrangement of the second cooccurrence table 35.

In a first field $f_2 1$, the single special cooccurrence codes and the collective special cooccurrence codes extracted from the field of "CASE ELEMENT Semantic restriction," the field of "SUBORDINATE COUNTERPART Semantic restriction," or the field of "SEMANTIC ATTRIBUTE CODE" of the dictionary 39 are registered. In a second field $f_2 2$, entry words extracted from the dictionary 39 which are dominant words are registered. Further, in a third field $f_2 3$, entry words extracted from the dictionary 39 which are subordinate words dependent upon the respective dominant words are registered.

The information retrieval system with the above-described arrangement retrieves and outputs cooccurrence information associated with a key word in the following manner.

Figure 24:
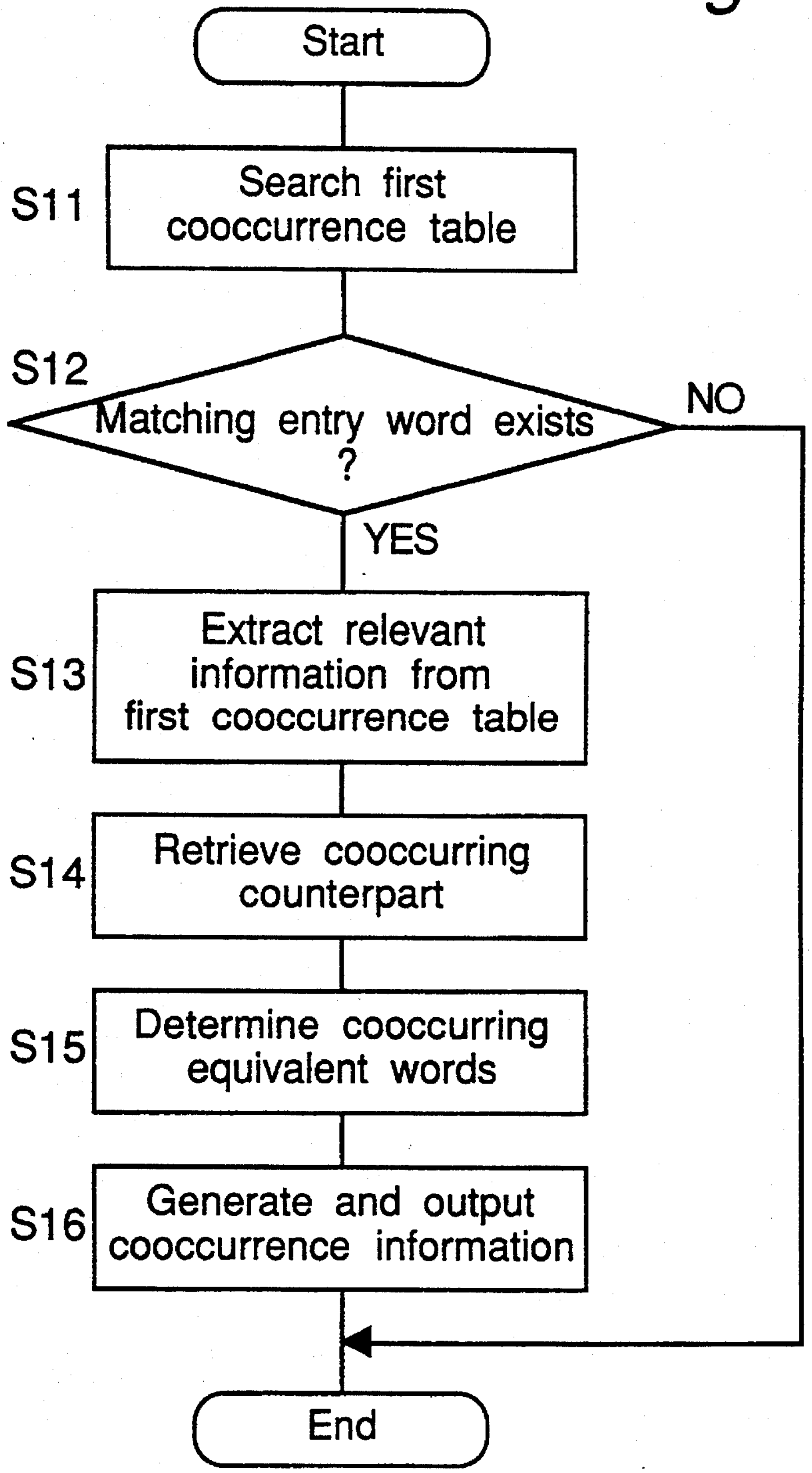
FIG. 24 is a flow chart of the cooccurrence information retrieval operation.

FIG. 24 is a flow chart of the operation of cooccurrence information retrieval process executed by the retrieval controller 46. Hereinbelow, the operation of cooccurrence information retrieval process is described by way of examples with reference to FIGS. 8–19 and FIGS. 21–24.

The following key word (the first language in this example is English) is inputted from the input unit 31 shown in FIG. 21:

KEY WORD 1: "attention"

and an instruction for starting the retrieval is issued. Then, the key word "attention" is stored in the key-word buffer 40.

At step S11, the first field $f_1 1$ of the first cooccurrence table 33 is searched by the first cooccurrence table searcher 32.

At step S12, it is discriminated whether or not there exists an entry word matching the key word "attention" as a result of the search at step S11. If there is, the program goes to step S13. If not, on the other hand, the program ends the operation of cooccurrence information retrieval process. In the case of the key word "attention", there is a corresponding key word and the program goes to step S13.

At step S13, a single special cooccurrence code "8000" is extracted from the second field $f_1 2$ in the row of the entry word "attention" of the first cooccurrence table 33 matching the key word "attention," while a part of speech NN=noun is extracted from the third field $f_1 3$. The symbol NN is not accompanied by the mark *, so that it is obvious that the word "attention" is a subordinate word. First cooccurrence table information extracted in this way is stored in the first search result buffer 41.

At step S14, based on the single special cooccurrence code "8000" stored in the first search result buffer 41, the first field $f_2 1$ of the second cooccurrence table 35 is searched by the second cooccurrence table searcher 34 to seek for the code "8000." Further, the third field $f_2 3$ in the row of the matching single special cooccurrence code "8000" is searched, so that an entry word "attention" matching the key word "attention" is found. Then, a dominant counterpart "give" to cooccur with the subordinate-side word "attention" is retrieved from the second field $f_2 2$ in the row of the entry word "attention," and stored in the second cooccurrence table search result buffer 42.

The reason why the third field $f_2 3$ of the second cooccurrence table is first searched in determining the cooccurring counterpart is as follows. Since the part of speech "NN" extracted from the first cooccurrence table at the step S13 has no "*" mark added thereto, the key word "attention" is a dependent or subordinate word governable by a dominant word. Therefore, by searching the third field $f_2 3$ storing entry words which are subordinate words, the entry word "attention" is selected from among the entry words having the same single special cooccurrence code "8000."

In this example, because the dominant words and the subordinate words are set in one-to-one correspondence to each other by the aid of the single special cooccurrence code, the cooccurring counterpart word "give" is determined in a single way.

At step S15, the dictionary 39 is searched by the dictionary lookup part 36 based on the key word "attention" stored in the key-word buffer 40, the single special cooccurrence code "8000" and part of speech "noun" stored in the first search result buffer 41, and the cooccurring counterpart "give" stored in the second search result buffer 42, so that equivalent words in the second language (Japanese in this example) of the words in the first language in the dependency relation are determined. Then, the cooccurring equivalent words thus determined are stored in the dictionary lookup buffer 43.

At step S16, based on the cooccurring Japanese equivalent words stored in the dictionary lookup buffer 43, the key word "attention" stored in the key-word buffer 40, and the cooccurring counterpart "give" stored in the second search result buffer 42, the following cooccurrence information 1 is generated by the cooccurrence information generator 37:

COOCCURRENCE INFORMATION 1 :
give <attention> to (~NI) <CHUI> WO HARAU

This generated cooccurrence information is stored in the cooccurrence information buffer 44 and further outputted by the output unit 45.

As described above, when the key word "attention" is inputted, cooccurrence information of pairs of [give:(~WO) HARAU] and [attention:CHUI] in one-to-one correspondence is retrieved via the single special cooccurrence code "8000."

Another example is described below.

When the following English key word is inputted from the input unit 31 in FIG. 9, KEY WORD 2: "give"

the first cooccurrence table 33 is searched so that an entry word matching the key word "give" is retrieved at steps S 11 and S12. Then, a single special cooccurrence code "8000" is extracted from the second field $f_1 2$ in the row of the entry word "give" matching the key word "give", and a part of speech "VB* (verb)" is extracted from the third field $f_1 3$ at step S13.

At step S14, the first field $f_2$1 of the second cooccurrence table 35 is searched to find the single special cooccurrence code "8000." Also, the second field $f_2$2 in the rows having the single special cooccurrence code "8000" are searched for the word "give." Then, a counterpart "attention" to cooccur with the word "give" is retrieved from the third field $f_2$3.

Furthermore, at step S15 the dictionary 39 is checked based on the key word "give," the single special cooccurrence code "8000," the part of speech "noun," and the cooccurring counterpart "attention" obtained above, so that Japanese equivalent words of the English words in the dependency relation are determined. Then, at step S16 the following cooccurrence information 2 is generated by the cooccurrence information generator 37:

COOCCURRENCE INFORMATION 2 :
give <attention> to (~NI) <CHUI> WO HARAU

In this way, cooccurrence information of one-to-one correspondence between pairs of [give:(~WO) HARAU] and [attention:CHUI] is retrieved via the single special cooccurrence code "8000."

Accordingly, in the case where the words in the dependency relation are associated with each other in one-to-one correspondence, whichever word (dominant word or subordinate word) is the key word, the same cooccurrence information can be obtained.

Next, an example in which cooccurrence information is retrieved by using the collective special cooccurrence code is described.

When the following English key word is inputted from the input unit 31,

KEY WORD 3: "high"

the first cooccurrence table 33 is searched so that an entry word matching the key word "high" is found. Then, a collective special cooccurrence code "9010" is extracted from the second field $f_1$2 in the row of the entry word "high" matching the key word "high," and a part of speech "VB*= adjective" is extracted from the third field $f_1$3.

The first field $f_2$1 of the second cooccurrence table 35 is searched for information matching the collective special cooccurrence code "9010" stored in the first search result buffer, and the second field $f_2$2 in the rows of the matching single special cooccurrence code "9010" is searched for an entry word matching the key word "high." Next, a plurality counterparts "coupon," "interest," "speed," and "tension" of the "high" are found from the third field $f_2$3 in the rows having the entry word "high."

Further, the dictionary 39 is checked based on the key word "high," the single special cooccurrence code "9010," the part of speech "ADJECTIVE," and the cooccurring counterparts "coupon," "interest," "speed," and "tension." As a result, Japanese equivalent words of the English words in the dependency relation are determined.

Finally, the following cooccurrence information 3 is generated by the cooccurrence information generator 37:

COOCCURRENCE INFORMATION 3:

| | |
|---|---|
| high <coupon> | KOURIMAWARI |
| high <interest> | KOUKINRI |
| high <speed> | KOUSOKU |
| high <tension> | KOUATSU (where the field is electrical). |

In this way, when the key word "high" is inputted, cooccurrence information of one-to-several correspondence between the pair of [high:KOU] and a set of the pairs of [coupon:RIMAWARI], [interest:KINRI], [speed:SOKU], [tension:ATSU] is retrieved via the collective special cooccurrence code "9010."

Likewise, when any one of the words to cooccur with the word "high" as the key word is inputted, the same cooccurrence information 3 is obtained via the collective special cooccurrence code "9010."

As described above, in the present embodiment, the dictionary 39 of the memory 38 in the information retrieval system is arranged in the same manner as in the dictionary 11 in the first embodiment.

The information retrieval system of the present embodiment is further provided with the first cooccurrence table 33 in which the entry word, the single special cooccurrence code or the collective special cooccurrence code, and the part of speech extracted from the dictionary 39 are associated with one another, and the second cooccurrence table 35 in which the single special cooccurrence code or the collective special cooccurrence code and the words in the dependency relation, extracted from the dictionary 39, are associated with one another via the special cooccurrence code.

Then, when a key word is inputted from the input unit 31, the first cooccurrence table 33 is searched by the first cooccurrence table searcher 32, so that the single special cooccurrence code or the collective special cooccurrence code, and the part of speech of the key word are obtained. The second cooccurrence table 35 is searched by the second cooccurrence table searcher 34, so that a cooccurring counterpart of the key word is obtained. Further, the dictionary 39 is searched by the dictionary lookup part 36, so that the cooccurring equivalent words are obtained. Thus, based on these pieces of information, cooccurrence information of the key word and its cooccurring counterpart is generated and outputted by the cooccurrence information generator 37.

Therefore, according to the present embodiment, the following various advantages can be offered.

First, because the second embodiment uses the dictionary 39 of the same arrangement as the dictionary 11 in the first embodiment, the advantages described above in connection with the dictionary 11 in the first embodiment can be obtained.

Further, in the dictionary 39, the dominant-side pair of [ENTRY WORD:EQUIVALENT WORD] and the subordinate side pair of [ENTRY WORD:EQUIVALENT WORD] are not registered in a fixed state unlike the conventional case where they are registered as the "composite entry word." Therefore, according to the present embodiment, even if a perfect form of an idiom is unknown, only inputting of a key word that forms part of the idiom allows the perfect form of the idiom to be outputted.

Also, since associated pairs of [WORD:EQUIVALENT WORD] possible to cooccur with each other are specified by the single special cooccurrence code or the collective special cooccurrence code, equivalent words of the words having a dependency relation, that is, a dominant-subordinate relation between them can be surely obtained, so that search and/or output of perfect cooccurrence information can be accomplished.

In the second embodiment, the first cooccurrence table 33 and the second cooccurrence table 35 are not essential. However, by extracting from the dictionary 39 and tabulating items necessary for information retrieval, the retrieval process can be performed with high speed.

The algorithms for the equivalent word selection operation and the cooccurrence information retrieval operation in the above-described embodiments are not limited to those shown in the flow charts of FIG. 20 and FIG. 24.

Besides, needless to say, concrete contents of the dictionary 11 and the dictionary 39 are not limited to those shown in FIGS. 8–19.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for processing cooccurrence of a plurality of words in a first language, with a dependency relation among the plurality of words, when the first language is converted into a second language, comprising:

language information storage means for storing entry words in the first language, representing respective words in the first language, and equivalent words of the entry words in the second language, in pairs, wherein a first pair of entry and equivalent words is stored separate from another pair of entry and equivalent words which may cooccur with the first pair, the first and another pair being associated by a cooccurrence code imparted to and stored with each of the associated first and another pairs, wherein a word in the first language represented by the entry word of the first pair is a dominant word and a word in the first language represented by the entry word of the associated another pair is a subordinate word syntactically dependent on the dominant word; and first search means for, upon receipt of the entry word in one of the first and another associated pairs of entry and equivalent words, searching the language information storage means for the other of the first and another associated pairs of entry and equivalent words using the imparted cooccurrence code.

2. The apparatus of claim 1, wherein the cooccurrence code is a semantic code representing a semantic cooccurrence relationship between the dominant word and the subordinate word.

3. The apparatus of claim 1, wherein when the dominant word can semantically cooccur with only one subordinate word, the cooccurrence code indicates that the associated first and another pairs of entry and equivalent words corresponding to the dominant and subordinate words are in one-to-one correspondence.

4. The apparatus of claim 1, wherein when the dominant word can semantically cooccur with any one of a plurality of subordinate words, the cooccurrence code indicates that the associated first and another pairs of entry and equivalent words are in one-to-several correspondence.

5. The apparatus of claim 1, wherein the language information storage means further stores information regarding rules used in selecting, when an entry word includes a plurality of equivalent words, one of the plurality of equivalent words, to ensure that an appropriate equivalent word is selected.

6. The apparatus of claim 1, wherein the apparatus is an electronic dictionary apparatus.

7. The apparatus of claim 1, wherein the apparatus is a machine translation system and further comprises:

inputting means for inputting text in the first language;

analyzing means for syntactically analyzing the text in the first language; and translation generation means for, when the text inputted by the inputting means contains a dominant word and a subordinate word syntactically dependent upon the dominant word, that cooccur, generating a translation of the text in the second language based on associated pairs of entry and equivalent words for the dominant and subordinate words.

8. The apparatus of claim 2, wherein the apparatus is a machine translation system and further comprises:

inputting means for inputting text in the first language;

analyzing means for syntactically analyzing the text in the first language; and translation generation means for, when the text inputted by the inputting means contains a dominant word and a subordinate word syntactically dependent upon the dominant word, that cooccur, generating a translation of the text in the second language based on associated pairs of entry and equivalent words for the dominant and subordinate words.

9. The apparatus of claim 3, wherein the apparatus is a machine translation system and further comprises:

inputting means for inputting text in the first language;

analyzing means for syntactically analyzing the text in the first language; and translation generation means for, when the text inputted by the inputting means contains a dominant word and a subordinate word syntactically dependent upon the dominant word, that cooccur, generating a translation of the text in the second language based on associated pairs of entry and equivalent words for the dominant and subordinate words.

10. The apparatus of claim 4, wherein the apparatus is a machine translation system and further comprises:

inputting means for inputting text in the first language;

analyzing means for syntactically analyzing the text in the first language; and translation generation means for, when the text inputted by the inputting means contains a dominant word and a subordinate word syntactically dependent upon the dominant word, that cooccur, generating a translation of the text in the second language based on associated pairs of entry and equivalent words for the dominant and subordinate words.

11. The apparatus of claim 5, wherein the apparatus is a machine translation system and further comprises:

inputting means for inputting text in the first language;

analyzing means for syntactically analyzing the text in the first language; and translation generation means for, when the text inputted by the inputting means contains a dominant word and a subordinate word syntactically dependent upon the dominant word, that cooccur, generating a translation of the text in the second language based on associated pairs of entry and equivalent words for the dominant and subordinate words.

12. The apparatus of claim 1, wherein the apparatus is an information retrieval apparatus and further comprises:

inputting means for inputting a key word in the first language;

second search means for searching for an entry word matching the inputted key word, the first search means thereafter performing the search of the language information storage means using the entry word matching the inputted key word; and information generation means for generating cooccurring information portions based on a pair of entry and equivalent words corresponding to the key word and a pair of entry and equivalent words associated with the pair of entry and equivalent words corresponding to the key word, obtained from the search performed by the first search means.

13. The apparatus of claim 2, wherein the apparatus is an information retrieval apparatus and further comprises:

inputting means for inputting a key word in the first language;

second search means for searching for an entry word matching the inputted key word, the first search means thereafter performing the search of the language information storage means using the entry word matching the inputted key word; and information generation means for generating cooccurring information portions based on a pair of entry and equivalent words corresponding to the key word and a pair of entry and equivalent words associated with the pair of entry and equivalent words corresponding to the key word, obtained from the search performed by the first search means.

14. The apparatus of claim 3, wherein the apparatus is an information retrieval apparatus and further comprises:

inputting means for inputting a key word in the first language;

second search means for searching for an entry word matching the inputted key word, the first search means thereafter performing the search of the language information storage means using the entry word matching the inputted key word; and information generation means for generating cooccurring information portions based on a pair of entry and equivalent words corresponding to the key word and a pair of entry and equivalent words associated with the pair of entry and equivalent words corresponding to the key word, obtained from the search performed by the first search means.

15. The apparatus of claim 4, wherein the apparatus is an information retrieval apparatus and further comprises:

inputting means for inputting a key word in the first language;

second search means for searching for an entry word matching the inputted key word, the first search means thereafter performing the search of the language information storage means using the entry word matching the inputted key word; and information generation means for generating cooccurring information portions based on a pair of entry and equivalent words corresponding to the key word and a pair of entry and equivalent words associated with the pair of entry and equivalent words corresponding to the key word, obtained from the search performed by the first search means.

16. The apparatus of claim 5, wherein the apparatus is an information retrieval apparatus and further comprises:

inputting means for inputting a key word in the first language;

second search means for searching for an entry word matching the inputted key word, the first search means thereafter performing the search of the language information storage means using the entry word matching the inputted key word; and information generation means for generating cooccurring information portions based on a pair of entry and equivalent words corresponding to the key word and a pair of entry and equivalent words associated with the pair of entry and equivalent words corresponding to the key word, obtained from the search performed by the first search means.

17. The apparatus of claim 12, further comprising:

a first table listing a plurality of entry words and corresponding cooccurrence codes and parts of speech, extracted from the language information storage means; and a second table listing the plurality of cooccurrence codes, a plurality of entry words corresponding to dominant words and corresponding to one of the plurality of cooccurrence codes, and a plurality of entry words corresponding to subordinate words and corresponding to one of the plurality of cooccurrence codes, wherein the second search means searches the first and second tables for the entry word matching the inputted key word and for an entry word having a dominant/subordinate dependency relation with the entry word matching the key word.

18. An electronic dictionary, comprising:

language information storage means for storing a plurality of entry words in a first language, corresponding to respective words in the first language, and equivalent words of the entry words in a second language, in pairs, wherein a first pair of entry and equivalent words is stored separate from another pair of entry and equivalent words which may cooccur with the first pair, the first and another pair being associated by a cooccurrence code imparted to and stored with each of the associated first and another pairs, wherein a word in the first language represented by the entry word of the first pair is a dominant word and a word in the first language represented by the entry word of the associated another pair is a subordinate word syntactically dependent on the dominant word.

19. The electronic dictionary of claim 18, wherein the cooccurrence code is a semantic code representing a semantic cooccurrence relationship between the dominant word and the subordinate word.

20. The electronic dictionary of claim 18, wherein when the dominant word can semantically cooccur with only one subordinate word, the cooccurrence code indicates that the associated first and another pairs of entry and equivalent words corresponding to the dominant and subordinate words are in one-to-one correspondence.

21. The electronic dictionary of claim 18, wherein when the dominant word can semantically cooccur with any one of a plurality of subordinate words, the cooccurrence code indicates that the associated first and another pairs of entry and equivalent words are in one-to-several correspondence.

22. The electronic dictionary of claim 18, wherein the language information storage means further stores information regarding rules for selecting, when an entry word includes a plurality of equivalent words, one of the plurality of equivalent words to ensure that an appropriate equivalent word is selected.

* * * * *